United States Patent
Hwang et al.

(10) Patent No.: US 11,836,951 B2
(45) Date of Patent: Dec. 5, 2023

(54) IMAGE SIGNAL PROCESSOR FOR PROCESSING IMAGES

(71) Applicant: QUALCOMM Incorporated, San Diego, CA (US)

(72) Inventors: Hau Hwang, San Diego, CA (US); Tushar Sinha Pankaj, San Diego, CA (US); Vishal Gupta, Gainesville, FL (US); Jisoo Lee, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 17/665,281

(22) Filed: Feb. 4, 2022

(65) Prior Publication Data

US 2022/0215588 A1 Jul. 7, 2022

Related U.S. Application Data

(63) Continuation of application No. 16/814,783, filed on Mar. 10, 2020, now Pat. No. 11,263,782, which is a
(Continued)

(51) Int. Cl.
*G06T 7/90* (2017.01)
*G06T 3/00* (2006.01)
(Continued)

(52) U.S. Cl.
CPC ............. *G06T 7/90* (2017.01); *G06N 3/04* (2013.01); *G06N 20/00* (2019.01); *G06T 3/0031* (2013.01);
(Continued)

(58) Field of Classification Search
CPC .. G06V 30/2504; G06V 10/255; G06V 10/50; G06V 10/772; G06V 40/103;
(Continued)

(56) References Cited

U.S. PATENT DOCUMENTS 6,023,663 A 2/2000 Kim
6,199,034 B1 3/2001 Wical
(Continued)

FOREIGN PATENT DOCUMENTS

| CN | 106709532 A | 5/2017 |
| CN | 106991646 A | 7/2017 |
| CN | 107169927 A | 9/2017 |

OTHER PUBLICATIONS

O'Shea K., et al., "An Introduction to Convolutional Neural Networks", Dec. 2, 2015 (Dec. 2, 2015), pp. 1-11, XP055491019, arXiv.org, Retrieved from the Internet: URL: https://arxiv.org/pdf/1511.08458.pdf. [Retrieved on Jul. 9, 2018].
(Continued)

*Primary Examiner* — Yosef Kassa
(74) *Attorney, Agent, or Firm* — QUALCOMM Incorporated

(57) ABSTRACT

Techniques are provided for using one or more machine learning systems to process input data including image data. The input data including the image data can be obtained, and at least one machine learning system can be applied to at least a portion of the image data to determine at least one color component value for one or more pixels of at least the portion of the image data. Based on application of the at least one machine learning system to at least the portion of the image data, output image data for a frame of output image data can be generated. The output image data includes at least one color component value for one or more pixels of the frame of output image data. Application of the at least one machine learning system causes the output image data to have a reduced dimensionality relative to the input data.

29 Claims, 16 Drawing Sheets

Related U.S. Application Data continuation of application No. 15/993,223, filed on May 30, 2018, now Pat. No. 10,643,306.

(60) Provisional application No. 62/571,182, filed on Oct. 11, 2017.

(51) Int. Cl.
*G06N 3/04* (2023.01)
*G06N 20/00* (2019.01)
*G06T 3/40* (2006.01)

(52) U.S. Cl.
CPC .. *G06T 3/4015* (2013.01); *G06T 2207/20084* (2013.01)

(58) Field of Classification Search
CPC ........ H04N 23/64; H04N 27/34; G06F 18/28; G06T 3/4015; G06T 3/4046
See application file for complete search history.

(56) References Cited

U.S. PATENT DOCUMENTS

| | | | |
|---|---|---|---|
| 6,453,056 B2 | 9/2002 | Laumeyer et al. | |
| 6,594,382 B1 | 7/2003 | Woodall | |
| 6,735,579 B1 | 5/2004 | Woodall | |
| 7,149,262 B1* | 12/2006 | Nayar | G06T 3/4015 375/341 |
| 7,353,994 B2 | 4/2008 | Farrall et al. | |
| 7,574,018 B2* | 8/2009 | Luo | G06V 10/772 701/28 |
| 7,650,319 B2 | 1/2010 | Hoffberg et al. | |
| 7,761,240 B2 | 7/2010 | Saidi et al. | |
| 7,966,078 B2 | 6/2011 | Hoffberg et al. | |
| 8,077,958 B2 | 12/2011 | Qian et al. | |
| 8,243,991 B2* | 8/2012 | Das | G06V 30/2504 382/103 |
| 8,335,353 B2 | 12/2012 | Yamamoto et al. | |
| 8,352,400 B2 | 1/2013 | Hoffberg et al. | |
| 8,714,970 B2 | 5/2014 | Dahlhielm et al. | |
| 9,002,092 B2* | 4/2015 | Madabhushi | G06T 7/0012 382/128 |
| 9,009,595 B2* | 4/2015 | Catanese | H04N 21/4316 715/974 |
| 9,288,376 B2* | 3/2016 | Walker | H04N 1/00204 |
| 9,344,297 B2 | 5/2016 | Shah et al. | |
| 9,349,279 B2* | 5/2016 | Sangha | G08B 17/10 |
| 9,565,410 B2 | 2/2017 | Huai | |
| 9,565,440 B2* | 2/2017 | Li | H04N 19/124 |
| 9,571,731 B2 | 2/2017 | Shabtay et al. | |
| 9,626,766 B2 | 4/2017 | Criminisi et al. | |
| 9,633,282 B2 | 4/2017 | Sharma et al. | |
| 9,754,163 B2 | 9/2017 | Segalovitz et al. | |
| 9,760,827 B1 | 9/2017 | Lin et al. | |
| 10,643,306 B2 | 5/2020 | Hwang et al. | |
| 2016/0239706 A1 | 8/2016 | Dijkman et al. | |
| 2017/0124409 A1 | 5/2017 | Choi et al. | |
| 2017/0185871 A1 | 6/2017 | Zhang et al. | |
| 2019/0108618 A1 | 4/2019 | Hwang et al. | |
| 2020/0211229 A1 | 7/2020 | Hwang et al. | |

OTHER PUBLICATIONS

Deshpande A., "A Beginner's Guide To Understanding Convolutional Neural Networks", Sep. 7, 2017 (Sep. 7, 2017), XP55794403, XP055786406, pp. 1-8.

Gharbi M., et al., "Deep Joint Demosaicking and Denoising," ACM Transactions on Graphics (TOG), ACM, US, vol. 35 (6), Nov. 11, 2016, pp. 1-12, XP058306363, p. 2, left-hand column, paragraph 2; figure 2 p. 3, left-hand column, paragraph 3—right-hand column, last paragraph.

International Search Report and Written Opinion—PCT/US2018/054764—ISA/EPO—dated Jan. 23, 2019.

International Preliminary Report on Patentability—PCT/US2018/054764, The International Bureau of WIPO—Geneva, Switzerland, dated Apr. 23, 2020.

Prakash V.N.V.S., et al., "Deep Learning Approach for Image Denoising and Image Demosaicing," International Journal of Computer Applications, vol. 168, No. 9, Jun. 1, 2017, pp. 18-26, XP55539788.

Tan R., et al., "Color Image Demosaicking via Deep Residual Learning", IEEE International Conference on Multimedia and Expo (ICME), Jul. 10, 2017, pp. 793-798, XP55539783, pp. 794, right-hand column, last paragraph—p. 795, left-hand column, paragraph 3; figure 1.

* cited by examiner

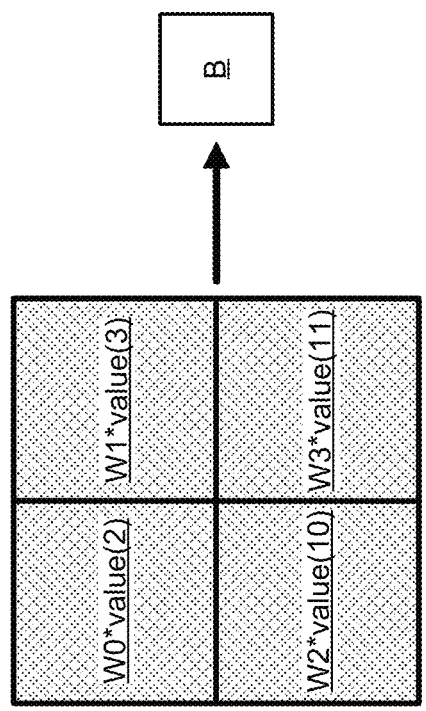

1200A

| R0 | R1 | R2 | R3 | R4 | R5 | R6 | R7 |
| --- | --- | --- | --- | --- | --- | --- | --- |
| R8 | R9 | R10 | R11 | R12 | R13 | R14 | R15 |
| R16 | R17 | R18 | R19 | R20 | R21 | R22 | R23 |
| R24 | R25 | R26 | R27 | R28 | R29 | R30 | R31 |
| R32 | R33 | R34 | R35 | R36 | R37 | R38 | R39 |
| R40 | R41 | R42 | R43 | R44 | R45 | R46 | R47 |
| R48 | R49 | R50 | R51 | R52 | R53 | R54 | R55 |
| R56 | R57 | R58 | R59 | R60 | R61 | R62 | R63 |

| G0 | G1 | G2 | G3 | G4 | G5 | G6 | G7 |
|----|----|----|----|----|----|----|----|
| G8 | G9 | G10 | G11 | G12 | G13 | G14 | G15 |
| G16 | G17 | G18 | G19 | G20 | G21 | G22 | G23 |
| G24 | G25 | G26 | G27 | G28 | G29 | G30 | G31 |
| G32 | G33 | G34 | G35 | G36 | G37 | G38 | G39 |
| G40 | G41 | G42 | G43 | G44 | G45 | G46 | G47 |
| G48 | G49 | G50 | G51 | G52 | G53 | G54 | G55 |
| G56 | G57 | G58 | G59 | G60 | G61 | G62 | G63 |

| B0 | B1 | B2 | B3 | B4 | B5 | B6 | B7 |
|----|----|----|----|----|----|----|----|
| B8 | B9 | B10 | B11 | B12 | B13 | B14 | B15 |
| B16 | B17 | B18 | B19 | B20 | B21 | B22 | B23 |
| B24 | B25 | B26 | B27 | B28 | B29 | B30 | B31 |
| B32 | B33 | B34 | B35 | B36 | B37 | B38 | B39 |
| B40 | B41 | B42 | B43 | B44 | B45 | B46 | B47 |
| B48 | B49 | B50 | B51 | B52 | B53 | B54 | B55 |
| B56 | B57 | B58 | B59 | B60 | B61 | B62 | B63 |

OBTAIN RAW IMAGE DATA CAPTURED USING ONE OR MORE IMAGE SENSORS, THE RAW IMAGE DATA INCLUDING A PLURALITY OF PIXELS, WHEREIN THE RAW IMAGE DATA INCLUDES A SINGLE COLOR COMPONENT PER PIXEL
1302

APPLY AT LEAST ONE NEURAL NETWORK TO THE RAW IMAGE DATA TO DETERMINE A PLURALITY OF COLOR COMPONENT VALUES FOR ONE OR MORE PIXELS OF THE PLURALITY OF PIXELS
1304

GENERATE AN OUTPUT IMAGE BASED ON APPLICATION OF THE AT LEAST ONE NEURAL NETWORK TO THE RAW IMAGE DATA, THE OUTPUT IMAGE HAVING THE PLURALITY OF COLOR COMPONENTS FOR THE ONE OR MORE PIXELS
1306

FIG. 13

IMAGE SIGNAL PROCESSOR FOR PROCESSING IMAGES

CROSS-REFERENCE TO RELATED APPLICATIONS

This application is a continuation of U.S. Non-Provisional application Ser. No. 16/814,783, filed Mar. 10, 2020, which is a continuation of U.S. Non-Provisional application Ser. No. 15/993,223, filed May 30, 2018, which claims the benefit of and priority to U.S. Provisional Application No. 62/571,182, filed Oct. 11, 2017, which is assigned to the assignee hereof and expressly incorporated herein by reference in its entirety and for all purposes.

FIELD

The present disclosure generally relates to image processing, and more specifically to techniques and systems for performing image processing using an image signal processor.

BRIEF SUMMARY

In some examples, techniques and systems are described for performing image processing. Traditional image signal processors (ISPs) have separate discrete blocks that address the various partitions of the image-based problem space. For example, a typical ISP has discrete functional blocks that each apply a specific operation to raw camera sensor data to create a final output image. Such functional blocks can include blocks for demosaicing, noise reduction (denoising), color processing, tone mapping, among many other image processing functions. Each of these functional blocks contains many hand-tuned parameters, resulting in an ISP with a large number of hand-tuned parameters (e.g., over 10,000) that must be re-tuned according to the tuning preference of each customer. Such hand-tuning is very time-consuming and expensive.

A machine learning ISP is described herein that uses machine learning systems and methods to derive the mapping from raw image data captured by one or more image sensors to a final output image. In some examples, raw image data can include a single color or a grayscale value for each pixel location. For example, a sensor with a Bayer pattern color filter array (or other suitable color filter array) with one of either red, green, or blue filters at each pixel location can be used to capture raw image data with a single color per pixel location. In some cases, a device can include multiple image sensors to capture the raw image data processed by the machine learning ISP. The final output image can contain processed image data derived from the raw image data. The machine learning ISP can use a neural network of convolutional filters (e.g., convolutional neural networks (CNNs)) for the ISP task. The neural network of the machine learning ISP can include several similar or repetitive blocks of convolutional filters with a high number of channels (e.g., an order of magnitude larger than the number of channels in an RGB or YCbCr image). The machine learning ISP functions as a single unit, rather than having individual functional blocks that are present in a traditional ISP.

The neural network of the ISP can include an input layer, multiple hidden layers, and an output layer. The input layer includes the raw image data from one or more image sensors. The hidden layers can include convolutional filters that can be applied to the input data, or to the outputs from previous hidden layers to generate feature maps. The filters of the hidden layers can include weights used to indicate an importance of the nodes of the filters. In some cases, the neural network can have a series of many hidden layers, with early layers determining simple and low level characteristics of a the raw image input data, and later layers building up a hierarchy of more complex and abstract characteristics. The neural network can then generate the final output image (making up the output layer) based on the determined high-level features.

According to at least one example, a method of processing image data using one or more neural networks is provided. The method includes obtaining raw image data captured using one or more image sensors. The raw image data includes a plurality of pixels. The raw image data includes a single color component per pixel. The method further includes applying at least one neural network to the raw image data to determine a plurality of color component values for one or more pixels of the plurality of pixels. The method further includes generating output image data based on application of the at least one neural network to the raw image data. The output image data has the plurality of color components for the one or more pixels.

In another example, an apparatus for processing image data using one or more neural networks is provided that includes a memory configured to store video data and a processor. The processor is configured to and can obtain raw image data captured using one or more image sensors. The raw image data includes a plurality of pixels. The raw image data includes a single color component per pixel. The processor is further configured to and can apply at least one neural network to the raw image data to determine a plurality of color component values for one or more pixels of the plurality of pixels. The processor is further configured to and can generate output image data based on application of the at least one neural network to the raw image data. The output image data has the plurality of color components for the one or more pixels.

In another example, a non-transitory computer-readable medium is provided that has stored thereon instructions that, when executed by one or more processors, cause the one or more processor to: obtaining raw image data captured using one or more image sensors, the raw image data including a plurality of pixels, wherein the raw image data includes a single color component per pixel; applying at least one neural network to the raw image data to determine a plurality of color component values for one or more pixels of the plurality of pixels; and generating output image data based on application of the at least one neural network to the raw image data, the output image data having the plurality of color components for the one or more pixels.

In another example, an apparatus for processing image data using one or more neural networks is provided. The apparatus includes means for obtaining raw image data captured using one or more image sensors. The raw image data includes a plurality of pixels. The raw image data includes a single color component per pixel. The apparatus further includes means for applying at least one neural network to the raw image data to determine a plurality of color component values for one or more pixels of the plurality of pixels. The apparatus further includes means for generating output image data based on application of the at least one neural network to the raw image data. The output image data has the plurality of color components for the one or more pixels.

In some aspects, the obtained raw image data includes image data from the one or more image sensors filtered by a color filter array. In some examples, the color filter array includes a Bayer color filter array.

In some aspects, the obtained raw image data includes a patch of raw image data. The patch of raw image data includes a subset of a frame of raw image data captured by the one or more image sensors.

In some aspects, generating the output image data includes generating a patch of output image data. The patch of output image data includes a subset of a frame of output image data, and application of the at least one neural network causes the patch of output image data to include fewer pixel locations than the patch of raw image data.

In some aspects, applying the at least one neural network to the raw image data includes applying one or more strided convolutional filters to the raw image data to generate reduced resolution data representative of the raw image data. For example, a strided convolutional filter can include a convolutional filter with a stride greater than one. Each strided convolutional filter of the one or more strided convolutional filters includes an array of weights.

In some aspects, each strided convolutional filter of the one or more strided convolutional filters includes a plurality of channels. Each channel of the plurality of channels includes a different array of weights.

In some aspects, the one or more strided convolutional filters include a plurality of strided convolutional filters. In some examples, the plurality of strided convolutional filters include: a first strided convolutional filter having a first array of weights, wherein application of the first strided convolutional filter to the raw image data generates a first set of weighted data representative of the raw image data, the first set of weighted data having a first resolution; and a second strided convolutional filter having a second array of weights, wherein application of the second strided convolutional filter generates a second set of weighted data representative of the raw image data, the second set of weighted data having a second resolution that is of a lower resolution than the first resolution.

In some aspects, the methods, apparatuses, and computer-readable medium described above further comprise: upscaling the second set of weighted data having the second resolution to the first resolution; and generating combined weighted data representative of the raw image data by combining the upscaled second set of weighted data with the first set of weighted data having the first resolution.

In some aspects, the methods, apparatuses, and computer-readable medium described above further comprise applying one or more convolutional filters to the combined weighted data to generate feature data representative of the raw image data. Each convolutional filter of the one or more convolutional filters include an array of weights.

In some aspects, the methods, apparatuses, and computer-readable medium described above further comprise: upscaling the feature data to a full resolution; and generating combined feature data representative of the raw image data by combining the upscaled feature data with full resolution feature data, the full resolution feature data being generated by applying a convolutional filter to a full resolution version of the raw image data.

In some aspects, generating the output image data includes applying a final convolutional filter to the feature data or the combined feature data to generate the output image data.

In some aspects, the methods, apparatuses, and computer-readable medium described above further comprise obtaining additional data for augmenting the obtained raw image data, the additional data including at least one or more of tone data, radial distance data, or auto white balance (AWB) gain data.

In some aspects, the plurality of color components per pixel include a red color component per pixel, a green color component per pixel, and a blue color component per pixel.

In some aspects, the plurality of color components per pixel include a luma color component per pixel, a first chroma color component per pixel, and a second chroma color component per pixel.

In some aspects, the at least one neural network jointly performs multiple image signal processor (ISP) functions.

In some aspects, the at least one neural network includes at least one convolutional neural network (CNN).

In some aspects, the at least one neural network includes a plurality of layers. In some aspects, the plurality of layers are connected with a high-dimensional representation of the raw image data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 11A-FIG. 11E are diagrams illustrating an example of application of the 2×2 filter of the strided convolutional neural network to the image patch, in accordance with some examples;

FIG. 12A is a diagram illustrating an example of a processed image output from the machine learning image signal processor, in accordance with some examples;

FIG. 12B is a diagram illustrating another example of a processed image output from the machine learning image signal processor, in accordance with some examples;

FIG. 12C is a diagram illustrating another example of a processed image output from the machine learning image signal processor, in accordance with some examples; and FIG. 13 is a flowchart illustrating an example of a process for processing image data using one or more neural networks, in accordance with some embodiments.

DETAILED DESCRIPTION

Figure 1:
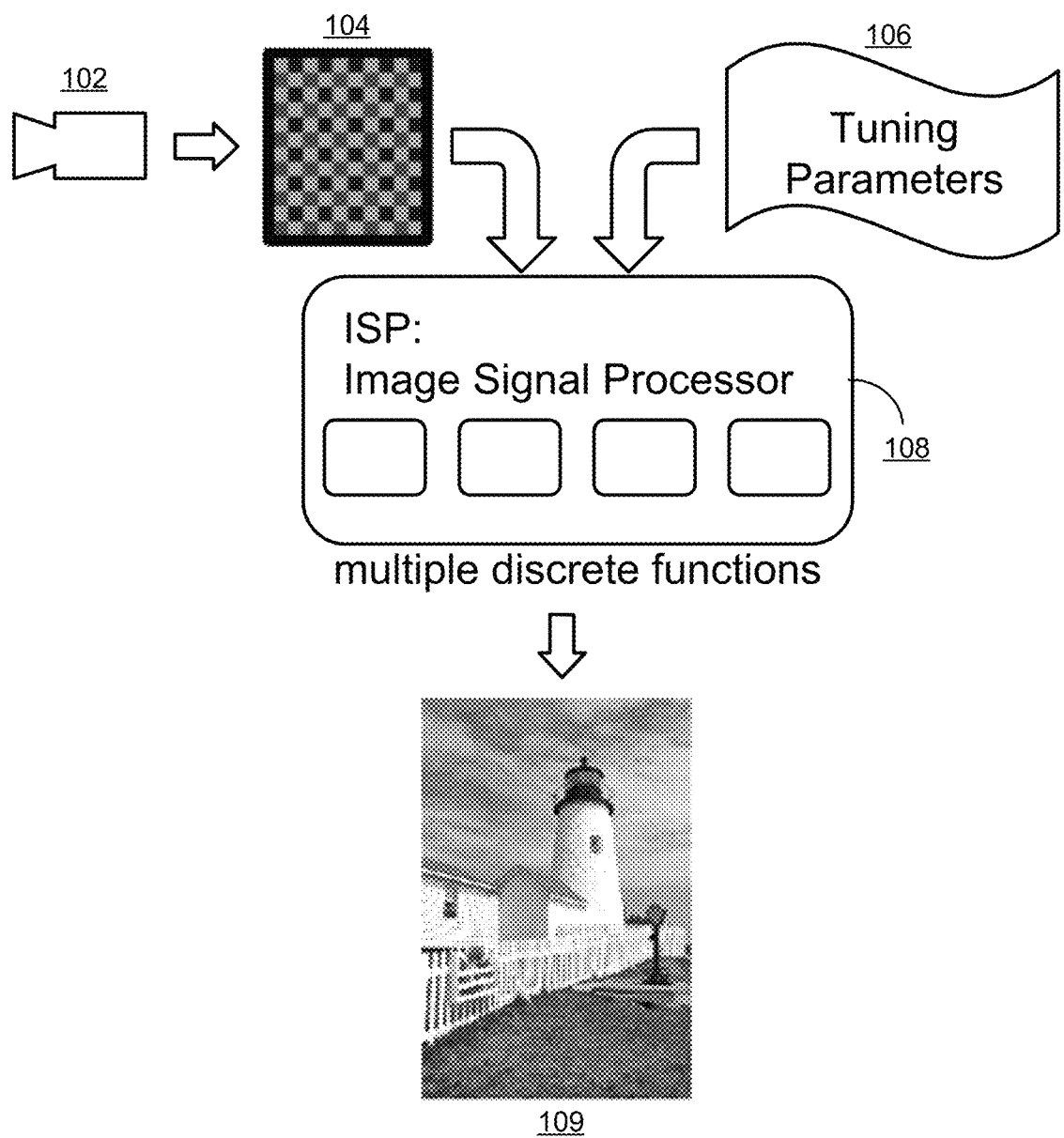
FIG. 1 is a block diagram illustrating an example of an image signal processor, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Image signal processing is needed to process raw image data captured by an image sensor for producing an output image that can be used for various purposes, such as for rendering and display, video coding, computer vision, storage, among other uses. A typical image signal processor (ISP) obtains raw image data, processes the raw image data, and produces a processed output image.

FIG. 1 is a diagram illustrating an example of a standard ISP 108. As shown, an image sensor 102 captures raw image data. The photodiodes of the image sensor 102 capture varying shades of gray (or monochrome). A color filter can be applied to the image sensor to provide a color filtered raw input data 104 (e.g., having a Bayer pattern). The ISP 108 has discrete functional blocks that each apply a specific operation to the raw camera sensor data to create the final output image. For example, functional blocks can include blocks dedicated for demosaicing, noise reduction (denoising), color processing, tone mapping, among many others. For example, a demosaicing functional block of the ISP 108 can assist in generating an output color image 109 using the color filtered raw input data 104 by interpolating the color and brightness of pixels using adjacent pixels. This demosaicing process can be used by the ISP 108 to evaluate the color and brightness data of a given pixel, and to compare those values with the data from neighboring pixels. The ISP 108 can then use the demosaicing algorithm to produce an appropriate color and brightness value for the pixel. The ISP 108 can perform various other image processing functions before providing the final output color image 109, such as noise reduction, sharpening, tone mapping and/or conversion between color spaces, autofocus, gamma, exposure, white balance, among many other possible image processing functions.

The functional blocks of the ISP 108 require numerous tuning parameters 106 that are hand-tuned to meet certain specifications. In some cases, over 10,000 parameters need to be tuned and controlled for a given ISP. For example, to optimize the output color image 109 according to certain specifications, the algorithms for each functional block must be optimized by tuning the tuning parameters 106 of the algorithms. New functional blocks must also be continuously added to handle different cases that arise in the space.

The large number of hand-tuned parameters leads to very time-consuming and expensive support requirements for an ISP.

Figure 2:
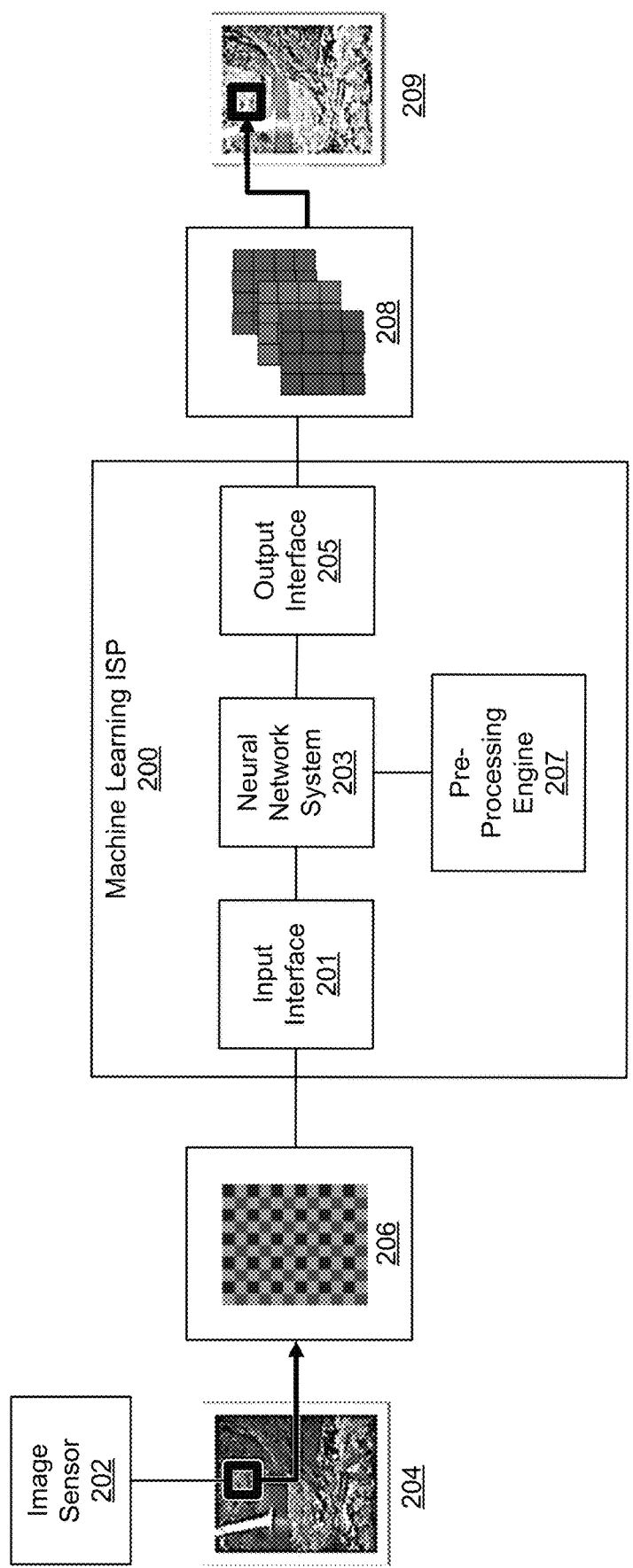
FIG. 2 is a block diagram illustrating an example of a machine learning image signal processor, in accordance with some examples.

A machine learning ISP is described herein that uses machine learning systems and methods to perform multiple ISP functions in a joint manner. FIG. 2 is a diagram illustrating an example of a machine learning ISP 200. The machine learning ISP 200 can include an input interface 201 that can receive raw image data from an image sensor 202. In some cases, the image sensor 202 can include an array of photodiodes that can capture a frame 204 of raw image data. Each photodiode can represent a pixel location and can generate a pixel value for that pixel location. Raw image data from photodiodes may include a single color or grayscale value for each pixel location in the frame 204. For example, a color filter array can be integrated with the image sensor 202 or can be used in conjunction with the image sensor 202 (e.g., laid over the photodiodes) to convert the monochromatic information to color values.

One illustrative example of a color filter array includes a Bayer pattern color filter array (or Bayer color filter array), allowing the image sensor 202 to capture a frame of pixels having a Bayer pattern with one of either red, green, or blue filters at each pixel location. For example, the raw image patch 206 from the frame 204 of raw image data has a Bayer pattern based on a Bayer color filter array being used with the image sensor 202. The Bayer pattern includes a red filter, a blue filter, and a green filter, as shown in the pattern of the raw image patch 206 shown in FIG. 2. The Bayer color filter operates by filtering out incoming light. For example, the photodiodes with the green part of the pattern pass through the green color information (half of the pixels), the photodiodes with the red part of the pattern pass through the red color information (a quarter of the pixels), and the photodiodes with the blue part of the pattern pass through the blue color information (a quarter of the pixels).

In some cases, a device can include multiple image sensors (which can be similar to image sensor 202), in which case the machine learning ISP operations described herein can be applied to raw image data obtained by the multiple image sensors. For example, a device with multiple cameras can capture image data using the multiple cameras, and the machine learning ISP 200 can apply ISP operations to the raw image data from the multiple cameras. In one illustrative example, a dual-camera mobile phone, tablet, or other device can be used to capture larger images with wider angles (e.g., with a wider field-of-view (FOV)), capture more amount of light (resulting in more sharpness, clarity, among other benefits), to generate 360-degree (e.g., virtual reality) video, and/or to perform other enhanced functionality than that achieved by a single-camera device.

The raw image patch 206 is provided to and received by the input interface 201 for processing by the machine learning ISP 200. The machine learning ISP 200 can use a neural network system 203 for the ISP task. For example, the neural network of the neural network system 203 can be trained to directly derive the mapping from raw image training data captured by image sensors to final output images. For example, the neural network can be trained using examples of numerous raw data inputs (e.g., with color filtered patterns) and also using examples of the corresponding output images that are desired. Using the training data, the neural network system 203 can learn a mapping from the raw input that is needed to achieve the output images, after which the ISP 200 can produce output images similar to those produced by a traditional ISP.

The neural network of the ISP 200 can include an input layer, multiple hidden layers, and an output layer. The input layer includes the raw image data (e.g., the raw image patch 206 or a full frame of raw image data) obtained by the image sensor 202. The hidden layers can include filters that can be applied to the raw image data, and/or to the outputs from previous hidden layers. Each of the filters of the hidden layers can include weights used to indicate an importance of the nodes of the filters. In one illustrative example, a filter can include a 3×3 convolutional filter that is convolved around an input array, with each entry in the 3×3 filter having a unique weight value. At each convolutional iteration (or stride) of the 3×3 filter applied to the input array, a single weighted output feature value can be produced. The neural network can have a series of many hidden layers, with early layers determining low level characteristics of an input, and later layers building up a hierarchy of more complex characteristics. The hidden layers of the neural network of the ISP 200 are connected with a high-dimensional representation of the data. For example, the layers can include several repetitive blocks of convolutions with a high number of channels (dimensions). In some cases, the number of channels can be an order of magnitude larger than the number of channels in an RGB or YCbCr image. Illustrative examples provided below include repetitive convolutions with 64 channels each, providing a non-linear and hierarchical network structure that produces quality image details. For example, as described in more detail herein, an n-number of channels (e.g., 64 channels) refers to having an n-dimensional (e.g., 64-dimensional) representation of the data at each pixel location. Conceptually, the n-number of channels represents "n-features" (e.g., 64 features) at the pixel location.

The neural network system 203 achieves the various multiple ISP functions in a joint manner. A particular parameter of the neural network applied by the neural network system 203 has no explicit analog in a traditional ISP, and, conversely, a particular functional block of a traditional ISP system has no explicit correspondence in the machine learning ISP. For example, the machine learning ISP performs the signal processing functions as a single unit, rather than having individual functional blocks that a typical ISP might contain for performing the various functions. Further details of the neural network applied by the neural network system 203 are described below.

In some examples, the machine learning ISP 200 can also include an optional pre-processing engine 207 to augment the input data. Such additional input data (or augmentation data) can include, for example, tone data, radial distance data, auto white balance (AWB) gain data, a combination thereof, or any other additional data that can augment the pixels of the input data. By supplementing the raw input pixels, the input becomes a multi-dimensional set of values for each pixel location of the raw image data.

Based on the determined high-level features, the neural network system 203 can generate an RGB output 208 based on the raw image patch 206. The RGB output 208 includes a red color component, a green color component, and a blue color component per pixel. The RGB color space is used as an example in this application. One of ordinary skill will appreciate that other color spaces can also be used, such as luma and chroma (YCbCr or YUV) color components, or other suitable color components. The RGB output 208 can be output from the output interface 205 of the machine learning ISP 200 and used to generate an image patch in the final output image 209 (making up the output layer). In some cases, the array of pixels in the RGB output 208 can include a lesser dimension than that of the input raw image patch 206. In one illustrative example, the raw image patch 206 can contain a 128×128 array of raw image pixels (e.g., in a Bayer pattern), while the application of the repetitive convolutional filters of the neural network system 203 causes the RGB output 208 to include an 8×8 array of pixels. The output size of the RGB output 208 being smaller than the raw image patch 206 is a byproduct of application of the convolutional filters and designing the neural network system 203 to not pad the data processed through each of the convolutional filters. By having multiple convolutional layers, the output size is reduced more and more. In such cases, the patches from the frame 204 of input raw image data can be overlapping so that the final output image 209 contains a complete picture. The resulting final output image 209 contains processed image data derived from the raw input data by the neural network system 203. The final output image 209 can be rendered for display, used for compression (or coding), stored, or used for any other image-based purposes.

Figure 3:
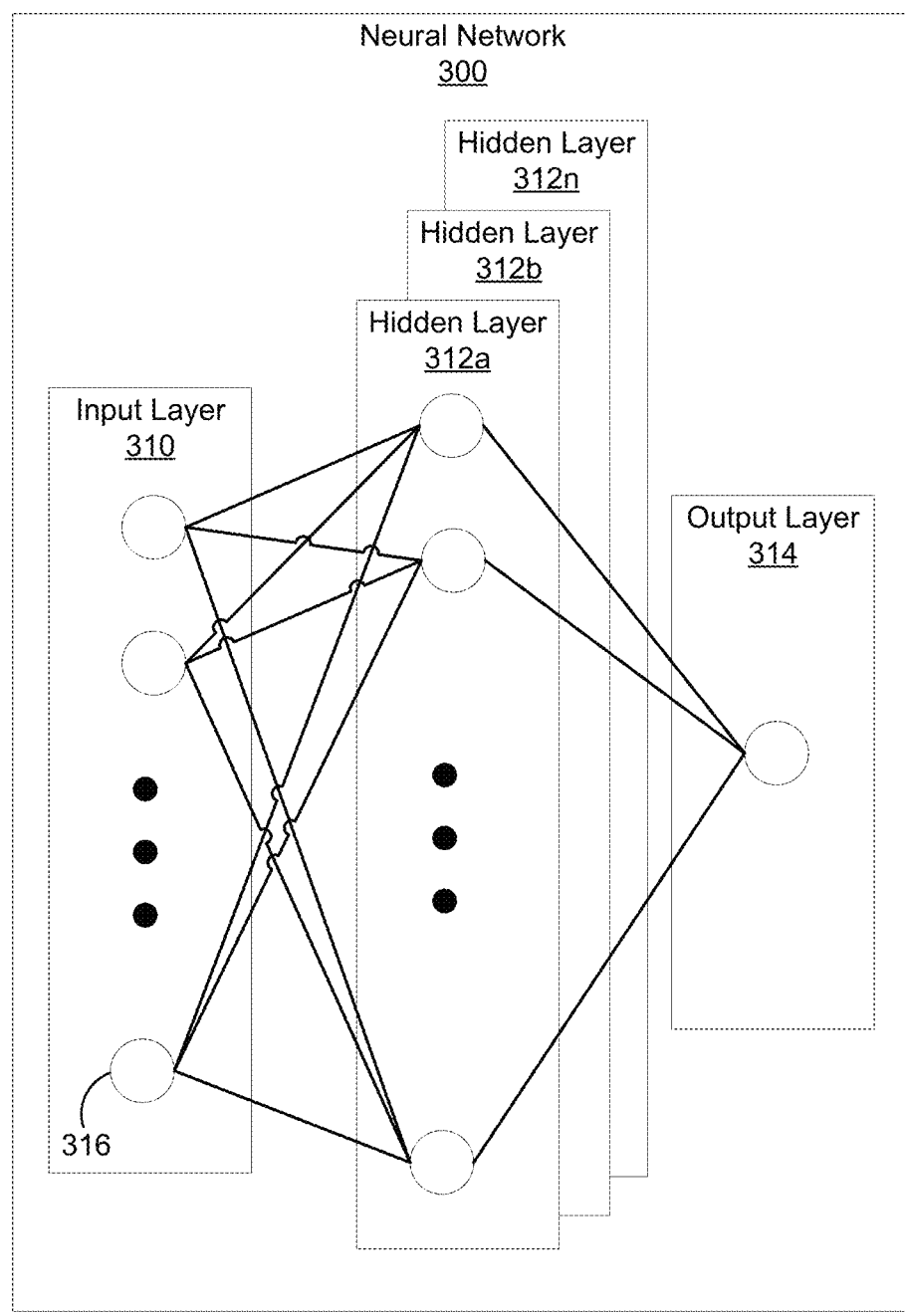
FIG. 3 is a block diagram illustrating an example of a neural network, in accordance with some examples.

FIG. 3 is an illustrative example of a neural network 300 that can be used by the neural network system 203 of the machine learning ISP 200. An input layer 310 includes input data. The input data of the input layer 310 can include data representing the raw image pixels of a raw image input frame. The neural network 300 includes multiple hidden layers 312*a*, 312*b*, through 312*n*. The hidden layers 312*a*, 312*b*, through 312*n* include "n" number of hidden layers, where "n" is an integer greater than or equal to one. The number of hidden layers can be made to include as many layers as needed for the given application. The neural network 300 further includes an output layer 314 that provides an output resulting from the processing performed by the hidden layers 312*a*, 312*b*, through 312*n*. In one illustrative example, the output layer 314 can provide a final processed output array of pixels that can be used for an output image (e.g., as a patch in the output image or as the complete output image).

The neural network 300 is a multi-layer neural network of interconnected filters. Each filter can be trained to learn a feature representative of the input data. Information associated with the filters is shared among the different layers and each layer retains information as information is processed. In some cases, the neural network 300 can include a feed-forward network, in which case there are no feedback connections where outputs of the network are fed back into itself. In some cases, the network 300 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 310 can activate a set of nodes in the first hidden layer 312*a*. For example, as shown, each of the input nodes of the input layer 310 can be connected to each of the nodes of the first hidden layer 312*a*. The nodes of the hidden layer 312 can transform the information of each input node by applying activation functions (e.g., filters) to these information. The information derived from the transformation can then be passed to and can activate the nodes of the next hidden layer 312*b*, which can perform their own designated functions. Example functions include convolutional functions, downscaling, upscaling, data transformation, and/or any other suitable functions. The output of the hidden layer 312*b* can then activate nodes of the next hidden layer, and so on. The output of the last hidden layer 312*n* can activate one or more nodes of the output layer 314, which provides a processed output image. In some cases, while nodes (e.g., node 316) in the neural network 300 are shown as having multiple output lines, a node has a single output and all lines shown as being output from a node represent the same output value.

In some cases, each node or interconnection between nodes can have a weight that is a set of parameters derived from the training of the neural network 300. For example, an interconnection between nodes can represent a piece of information learned about the interconnected nodes. The interconnection can have a tunable numeric weight that can be tuned (e.g., based on a training dataset), allowing the neural network 300 to be adaptive to inputs and able to learn as more and more data is processed.

Figure 4:
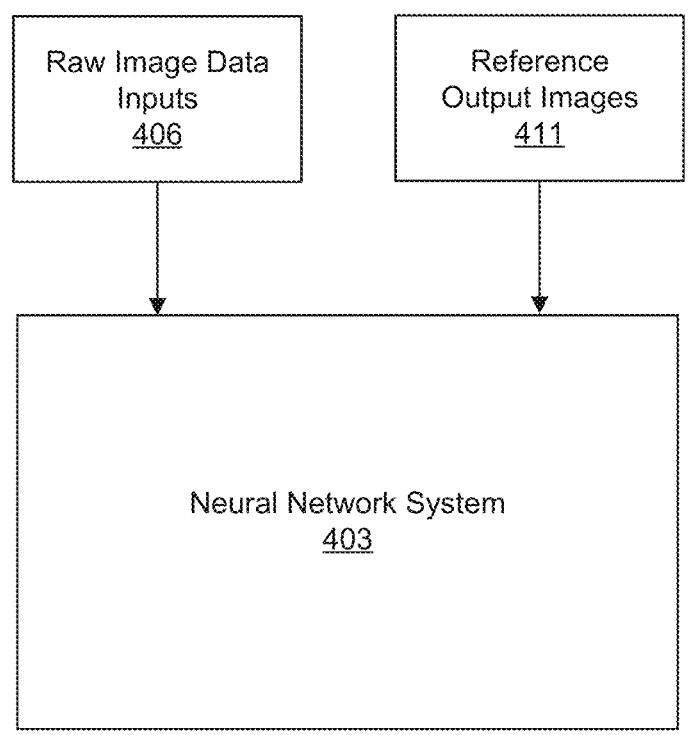
FIG. 4 is a diagram illustrating an example of training a neural network system of a machine learning image signal processor, in accordance with some examples.

The neural network 300 is pre-trained to process the features from the data in the input layer 310 using the different hidden layers 312*a*, 312*b*, through 312*n* in order to provide the output through the output layer 314. Referring to FIG. 4, a neural network (e.g., neural network 300) implemented by a neural network system 403 of a machine learning ISP can be pre-trained to process raw image data inputs and output processed output images. The training data includes raw image data inputs 406 and reference output images 411 that correspond to the raw image data inputs 406. For instance, an output image from the reference output images 411 can include a final output image that has previously been generated by a standard ISP (non-machine learning based) using a raw image data input. The reference output images 411 may, in some cases, include images processed using the neural network system 403. The raw image data inputs 406 and the reference output images 411 can be input into the neural network system 403, and the neural network (e.g., neural network 300) can determine the mapping from each set of raw image data (e.g., each patch of color filtered raw image data, each frame of color filtered raw image data, or the like) to each corresponding final output image by tuning the weights of the various hidden layer convolutional filters.

In some cases, the neural network 300 can adjust the weights of the nodes using a training process called back-propagation. Backpropagation can include a forward pass, a loss function, a backward pass, and a weight update. The forward pass, loss function, backward pass, and parameter update is performed for one training iteration. The process can be repeated for a certain number of iterations for each set of training images until the network 300 is trained well enough so that the weights of the layers are accurately tuned.

The forward pass can include passing through the network 300 a frame or patch of raw image data and a corresponding output image or output patch that was generated based on the raw image data. The weights of the various filters of the hidden layers can be initially randomized before the neural network 300 is trained. The raw data input image can include, for example, a multi-dimensional array of numbers representing the color filtered raw image pixels of the image. In one example, the array can include a 128×128×11 array of numbers with 128 rows and 128 columns of pixel locations and 11 input values per pixel location. Such an example is described in more detail below with respect to FIG. 7.

For a first training iteration for the network 300, the output may include values that do not give preference to any particular feature or node due to the weights being randomly selected at initialization. For example, if the output is an array with numerous color components per pixel location, the output image may depict an inaccurate color representation of the input. With the initial weights, the network 300 is unable to determine low level features and thus cannot make an accurate determination of what the color values might be. A loss function can be used to analyze error in the output. Any suitable loss function definition can be used. One example of a loss function includes a mean squared error (MSE). The MSE is defined as $$E_{total} = \sum \frac{1}{n}(\text{target} - \text{output})^2,$$

which calculates the mean or average of the squared differences (the actual answer minus the predicted (output) answer, squared). The term n is the number of values in the sum. The loss can be set to be equal to the value of $E_{total}$.

The loss (or error) will be high for the first training data (raw image data and corresponding output images) since the actual values will be much different than the predicted output. The goal of training is to minimize the amount of loss so that the predicted output is the same as the training label. The neural network 300 can perform a backward pass by determining which inputs (weights) most contributed to the loss of the network, and can adjust the weights so that the loss decreases and is eventually minimized.

In some cases, a derivative (or other suitable function) of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

Figure 5:
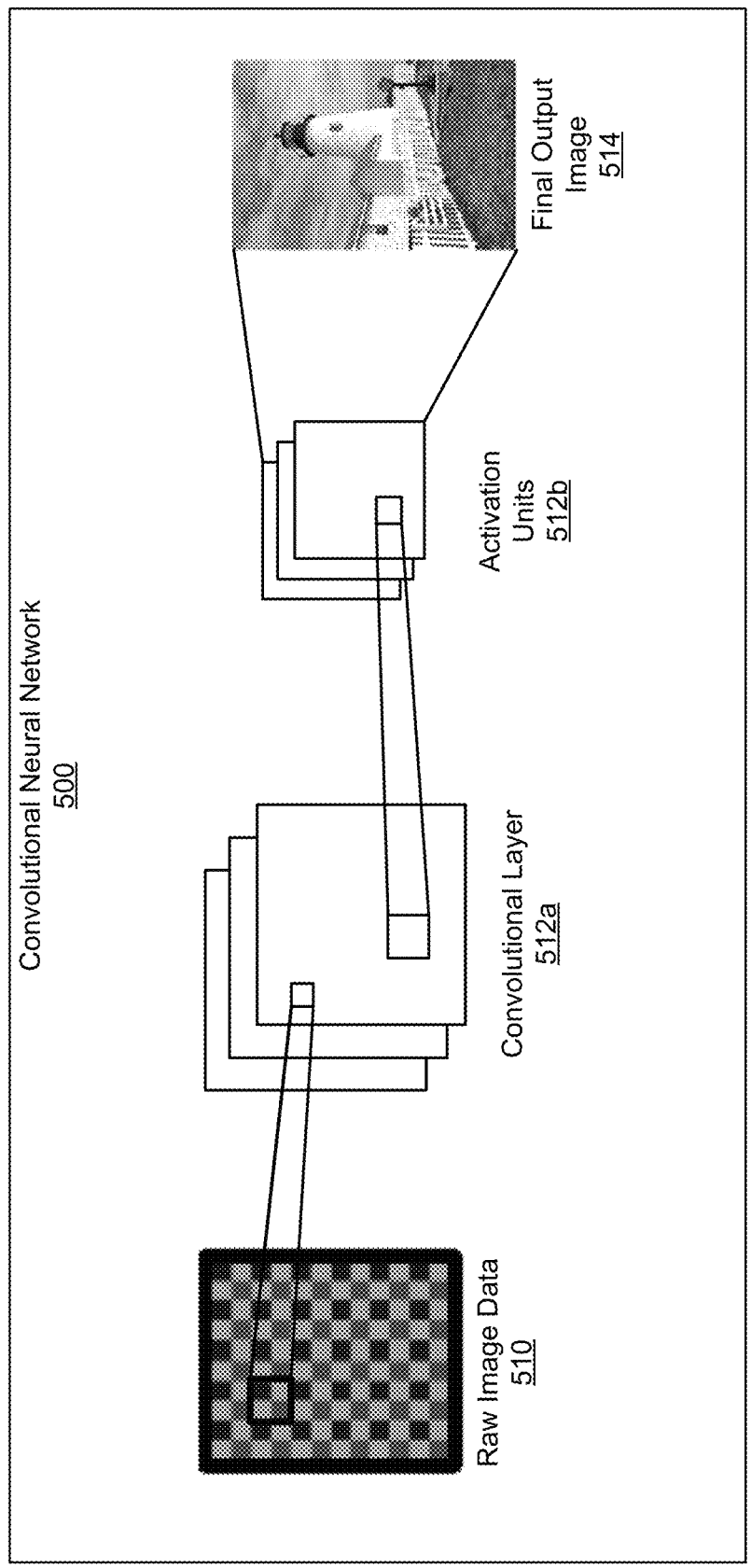
FIG. 5 is a block diagram illustrating an example of a convolutional neural network, in accordance with some examples.

The neural network (e.g., neural network 300) used by the machine learning ISP can include a convolutional neural network (CNN). FIG. 5 is a diagram illustrating a high level diagram of a CNN 500. The input includes the raw image data 510, which can include a patch of a frame of raw image data or a full frame of raw image data. The hidden layers of the CNN include a multi-channel convolutional layer 512a and an activation unit (e.g., a non-linear layer, exponential linear unit (ELU), or other suitable function). For example, raw image data can be passed through the series of multi-channel convolutional hidden layers and an activation unit per convolutional layer to get an output image 514 at the output layer.

The first layer of the CNN 500 includes the convolutional layer 512a. The convolutional layer 512a analyzes the raw image data 510. Each node of the convolutional layer 512a is connected to a region of nodes (pixels) of the input image called a receptive field. The convolutional layer 512a can be considered as one or more filters (each filter corresponding to a different feature map), with each convolutional iteration of a filter being a node or neuron of the convolutional layer 512a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional layer 512a. Each connection between a node and a receptive field for that node learns a weight and, in some cases, an overall bias such that each node learns to analyze its particular local receptive field in the input image. Each node of the convolutional layer 512a will have the same weights and bias (called a shared weight and a shared bias). For example, the filter has an array of weights (numbers) and a depth referred to as a channel. Examples provided below include filter depths of 64 channels.

The convolutional nature of the convolutional layer 512a is due to each node of the convolutional layer being applied to its corresponding receptive field. For example, a filter of the convolutional layer 512a can begin in the top-left corner of the input image array and can convolve around the input image. As noted above, each convolutional iteration of the filter can be considered a node of the convolutional layer 512a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together (or otherwise combined) to obtain a total sum for that iteration or node. The process is continued at a next location in the input image according to the receptive field of a next node in the convolutional layer 512a. For example, a filter can be moved by a stride amount to the next receptive field. The stride amount can be set to 1, 8, or other suitable amount, and can be different for each hidden layer. For example, if the stride amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 512a.

The mapping from the input layer to the convolutional layer 512a (or from one convolutional layer to a next convolutional layer) is referred to as a feature map (or a channel as described in more detail below). A feature map includes a value for each node representing the filter results at each location of the input volume. For example, each node of a feature map can include a weighted feature data value. The feature map can include an array that includes the various total sum values resulting from each iteration of the filter on the input volume. For example, the feature map will include a 24×24 array if a 5×5 filter is applied to each pixel (a step amount of 1) of a 28×28 input image. The convolutional layer 512a can include several feature maps in order to identify multiple features in an image. The example shown in FIG. 5 includes three feature maps. Using three feature maps (or channels), the convolutional layer 512a can provide a three-dimensional representation of the data at each pixel location of the final output image 514.

In some examples, an activation unit 512b can be applied after each convolutional layer 512a. The activation unit 512b can be used to introduce non-linearity to a system that has been computing linear operations. One illustrative example of a non-linear layer is a rectified linear unit (ReLU) layer. Another example is an ELU. A ReLU layer can apply the function f(x)=max(0, x) to all of the values in the input volume, which changes all the negative activations to 0. The ReLU can thus increase the non-linear properties of the network 500 without affecting the receptive fields of the convolutional layer 512a.

Figure 6:
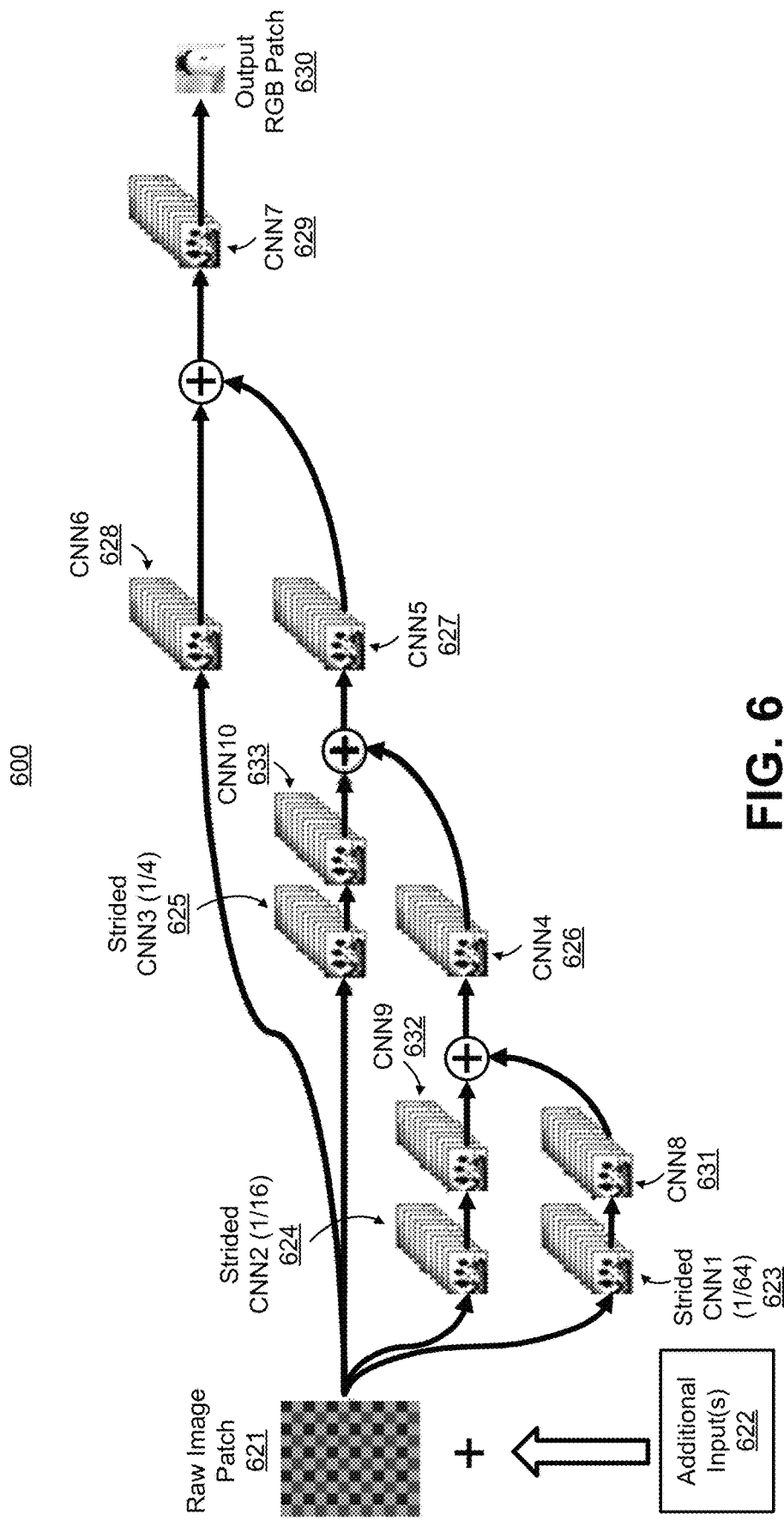
FIG. 6 is a diagram illustrating an example of a convolutional neural network of the machine learning image signal processor, in accordance with some examples.

FIG. 6 is a diagram illustrating a more detailed example of a convolutional neural network 600 of a machine learning ISP. The input to the network 600 is a raw image patch 621 (e.g., having a Bayer pattern) from a frame of raw image data, and the output includes an output RGB patch 630 (or a patch having other color component representations, such as YUV). In one illustrative example, the network takes 128×128 pixel raw image patches as input and produces 8×8×3 RGB patches as a final output. Based on the convolutional nature of the various convolutional filters applied by the network 600, many of the pixel locations outside of the 8×8 array from the raw image patch 621 are consumed by the network 600 to get the final 8×8 output patch. Such a reduction in data from the input to the output is due to the amount of context needed to understand the neighboring information to process a pixel. Having the larger input raw image patch 621 with all the neighboring information and context is helpful for the processing and production of the smaller output RGB patch 630.

In some examples, based on the reduction in pixel locations from the input to the output, the 128×128 raw image patches are designed so that they are overlapping in the raw input image. In such examples, the 8×8 outputs are not overlapping. For example, for a first 128×128 raw image patch in the upper left corner of the raw image frame, a first 8×8 RGB output patch is produced. A next 128×128 patch in the raw image frame will be 8 pixels to the right of the last 128×128 patch, and thus will be overlapping with the last 128×128 pixel patch. The next 128×128 patch will be processed by the network 600 to produce a second 8×8 RGB output patch. The second 8×8 RGB patch will be placed next to the first 8×8 RGB output patch (produced using the previous 128×128 raw image patch) in the full final output image. Such a process can be performed until 8×8 patches that make up a full output image are produced.

Additional inputs 622 can also be provided along with the raw image patch 621. For example, the additional inputs 622 can be provided by the pre-processing engine 207 to the neural network system 203. The additional inputs 622 can include any suitable supplemental data that can augment the color information provided by the raw image patch 621, such as tone data, radial distance data, auto white balance (AWB) gain data, a combination thereof, or any other additional data that can augment the pixels of the input data. By supplementing the raw input pixels, the input becomes a multi-dimensional set of values for each pixel location of the raw image data.

Figure 7:
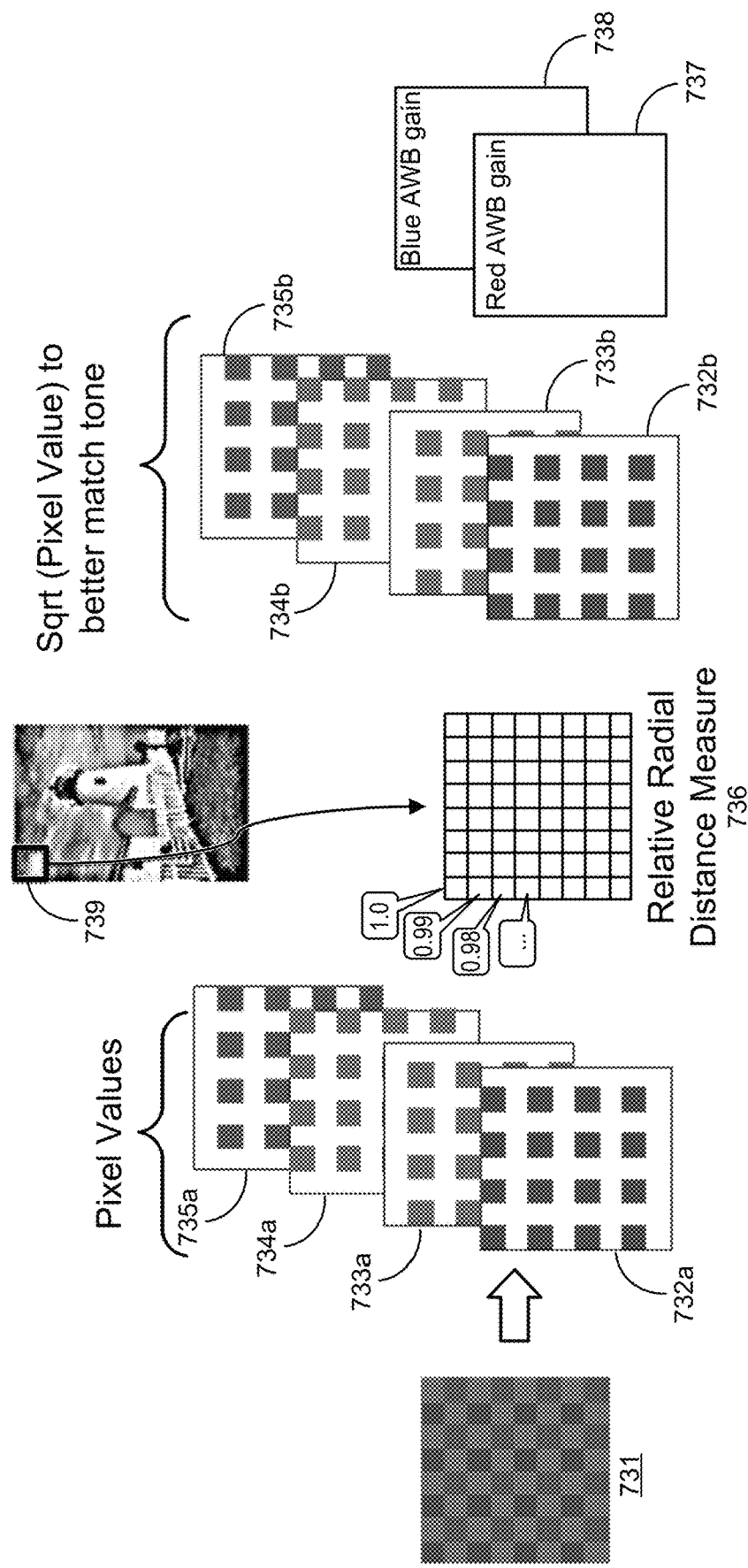
FIG. 7 is a diagram illustrating an example of a multi-dimensional input to the neural network of the machine learning image signal processor, in accordance with some examples.

FIG. 7 is a diagram illustrating an example of a multi-dimensional set of inputs for a raw image patch 731. The example shown in FIG. 7 includes a 128×128×11 dimension input. For example, there are 11 total inputs (dimensions) provided for each pixel location in the raw image patch 731. The 11 input dimensions include four dimensions for the colors, including one dimension for red values 732a, two dimensions for green values 733a and green values 734a, and one dimension for blue values 735a. There are two green values 733a and 734a due to the Bayer pattern having a green color on every row, and only one red value 732a and one blue value 735a due to the Bayer pattern having each of the red and blue colors on every other row. For example, as shown, the odd rows of the raw image patch 731 include red and green colors at every other pixel, and the even rows include green and blue colors at every other pixel. The white space in between the pixels at each color dimension (the red values 732a, green values 733a, 734a, and blue values 735a) shows the spatial layout of those colors from the raw image patch 731. For example, if all of the red values 732a, the green values 733a and 734a, and the blue values 735a were combined together, the result would be the raw image patch 731.

The input further includes one dimension for the relative radial distance measure 736, indicating the distances of the pixels from the center of the patch or frame. In some examples, the radial distance is the normalized distance from the center of the picture. For instance, the pixels in the four corners of the picture can have a distance equal to 1.0, while the pixel at the center of the image can have a distance equal to 0. In such examples, all other pixels can have distances between 0 and 1 based on the distance of those pixels from the center pixel. Such radial distance information can help supplement the pixel data, since the behavior of the image sensor can be different in the center of a picture versus the corners of the picture. For example, the corners and edges of a picture can be noisier than pixels in the center, since there is more light falling off the corners of the image sensor lens, in which case more gain and/or noise reduction can be applied to the corner pixels. The input also includes four dimensions for the square root of the colors. For example, a red square root dimension 732b, two green square root dimensions 733b and 734b, and a blue square root dimension 735b are provided. Using the square roots of the red, green, and blue colors helps to better match the tone of the pixels. The last two dimensions are for the gain of the entire patch, including one dimension for red automatic white balance (AWB) gain 737 and one dimension for the blue AWB gain 738. The AWB adjusts the gains of different color components (e.g. R, G and B) with respect to each other in order to make white objects white. The additional data assists the convolutional neural network 600 in understanding how to render the final output RGB patches.

Returning to FIG. 6, and using the example from FIG. 7 for illustrative purposes, the 128×128×11 input data is provided to the convolutional neural network 600 for processing. The convolutional filters of the network 600 provide a functional mapping of the input volume of the 128×128 raw image patch 621 to the 8×8 output RGB patch 630. For example, the network 600 operates to apply the various convolutional filter weights tuned during the training stage to the input features in different ways to finally drive the 8×8 output RGB patch 630. The convolutional filters include the strided CNN1 623, the strided CNN2 624, the strided CNN3 625, the CNN 631, the CNN 632, the CNN 633, the CNN 626, the CNN 627, the CNN 628, and the CNN 629. The convolutional filters provide a hierchical structure that helps to remove noise, enhance sharpening, produce images with fine details, among other benefits. For example, the various convolutional filters include repetitive blocks of convolutions with each convolutional filter having a high number of channels. The number of channels of each convolutional filter can be an order of magnitude larger than the number of channels in an RGB or YCbCr image. In one illustrative example, each of the CNN1 623 through CNN7 629 can include 64 channels, with each channel having different weight values in each of the nodes of the filter arrays. For instance, each of the channels for a given convolutional filter (e.g., for CNN7 629) can include the same array dimensions (e.g., a 3×3 filter, a 2×2 filter, or other suitable dimension) but with different weights being applied to the same input. In one illustrative example, filters of size 2×2 can be used for the strided CNN1 623, the strided CNN2 624, and the strided CNN3 625 in their layers, and filters of size 3×3 can be used for the CNN4 626, the CNN5 627, the CNN6 628, the CNN7 629, the CNN8 631, the CNN9 632, and the CNN10 633 in their layers.

Each channel of each convolutional filter (e.g., one of the CNNs shown in FIG. 7) has weights representing a dimension or feature of an image. The plurality of channels included for each convolutional filter or CNN provide high dimensional representations of the data at each pixel (with each channel providing an additional dimension). As the raw image patch 621 is passed through the various convolutional filter channels of the network 600, the weights are applied to transform these high dimensional representations as the data moves through the network, and to eventually produce the final output RGB patch 630. In one illustrative example, a channel of one of the convolutional filter CNNs may include information to figure out a vertical edge at a pixel location. A next channel might include information on a horizontal edge at each pixel location. A next channel can include information to figure out the diagonal edge. Other channels can include information related to color, noise, lighting, whiteness, and/or any other suitable features of an image. Each channel can represent a dimension of a pixel, and can provide information at the pixel that the network 600 is able to generate. In some cases, the convolutional filters working on the lower resolutions (CNN1 623, CNN2 624, and CNN3 625), as described in more detail below, include information relating to larger scale representations of the data, such as lower frequency colors for a general area, or other higher level feature. The other convolutional filters (CNN4 626, CNN5 627, CNN6 628, and CNN7 629) include information about smaller scale representations of the data.

Figure 8:
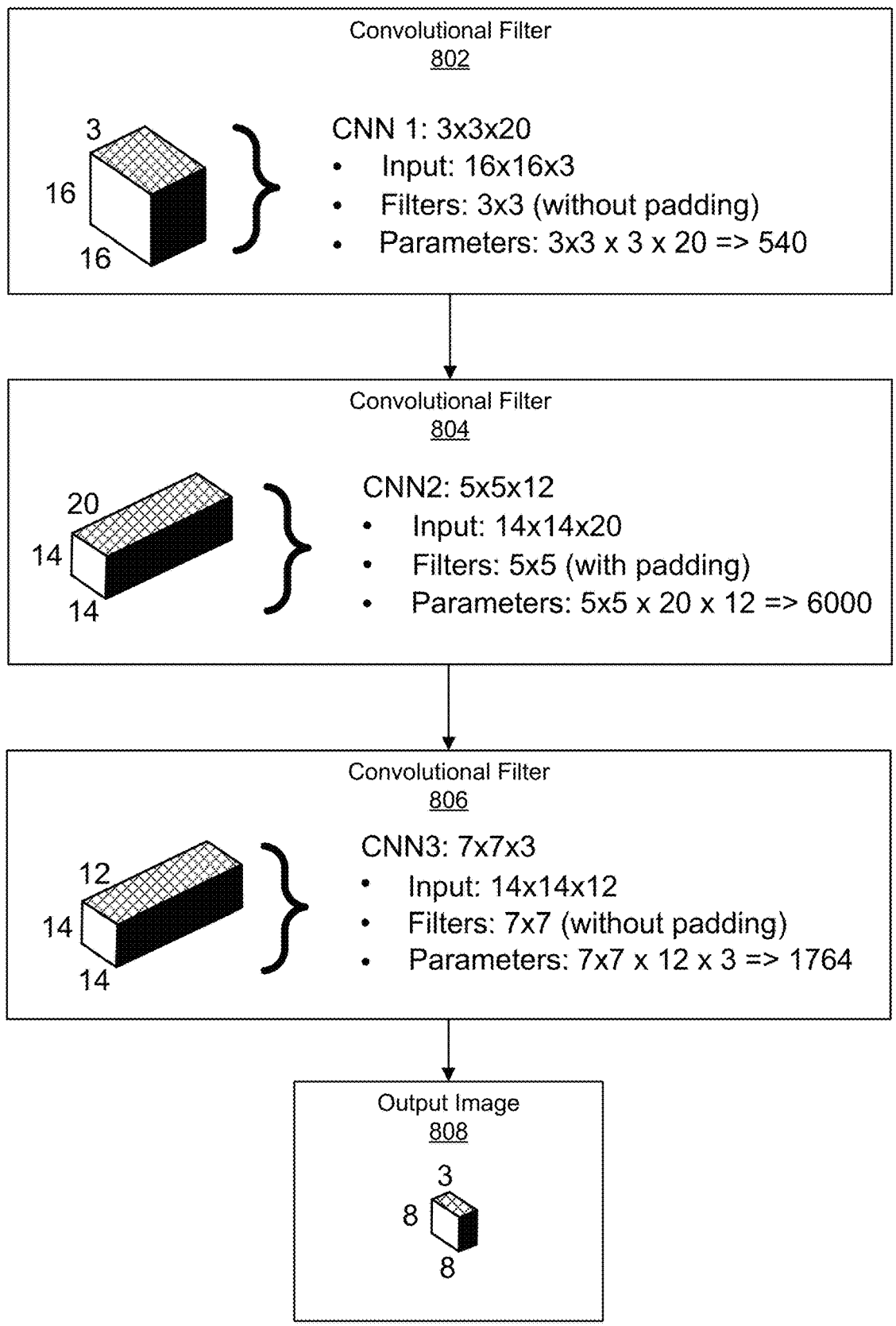
FIG. 8 is a diagram illustrating an example of multi-channel convolutional filters of a neural network, in accordance with some examples.

The concept of channels is described with respect to FIG. 8. FIG. 8 is a diagram illustrating an example structure of a neural network that includes a repetitive set of convolutional filters 802, 804, and 806. The convolutional filter 802 includes a first CNN (shown as CNN1 in FIG. 8) that includes 20 channels of 3×3 filters with a stride equal to 1 (without padding). At each channel, a filter has a different 3×3 set of weights that are pre-determined during the training of the neural network. The input to the convolutional filter 802 includes a 16×16×3 volume of image data. For example, the input can include a first 16×16 patch of green values, a second 16×16 patch of red values, and a third 16×16 patch of blue values. The 3×3 filter for every output channel (for each of the 20 channels) is convolutionally applied (with a stride equal to 1) on the input at the various spatial locations (the receptive fields) in the 16×16 input array, and also across the entire input depth for each color. For example, the 3×3 array for a first channel is convolutionally applied on the first input depth (the 16×16 array of green values), the second input depth (the 16×16 array of red values), and then the third input depth (the 16×16 array of blue values), resulting in 27 parameters for the first output channel. Such a convolutional application of the 3×3 filters is applied 20 times in total to the input volume, once for every one of the output channels. Applying the 20 3×3 filters to the input volume results in 540 parameters (3×3×3×20) that get determined in this set to produce the 14×14×20 output volume that is used as input by the convolutional filter 804. For example, each channel of the output is computed by applying the 3×3 filter to each depth of the input volume (e.g., the red, green, and blue depths). So the first channel output needs 3×3×3 multiplies and parameters. This result is summed to create the first channel output. A separate set of filters is then used to generate the second channel output, so this means another 3×3×3 multiplies with a different set of parameters. To finish the total number of channels (20 channels), 3×3×3×20 parameters are needed.

The 14×14×20 volume includes 14 rows and 14 columns of values due to the convolutional application of the 3×3 filters. For example, the 3×3 filters have a stride of 1, meaning that the filters can only be strided to each pixel location (e.g., so that each pixel location is in the upper-left corner of the array) for the first 14 rows and 14 columns of pixels in the 16×16 array (of the input) before the filter array reaches the end of the block. The result is a 14×14 array of weighted values for each of the 20 channels.

The convolutional filter 804 includes a second CNN (shown as CNN2 in FIG. 8) that includes 12 channels of 5×5 filters with padding and having a stride of 1. The input to the convolutional filter 804 includes the 14×14×20 volume that is output from the convolutional filter 802. The 5×5 filter for each of the 12 channels is convolutionally applied to the 14×14×20 volume. Applying the 12 channels of the 5×5 filters to the input volume results in 6000 parameters (5×5× 20×12). Based on the use of padding, the result is the 14×14×12 output volume that is used as input by the convolutional filter 806.

The convolutional filter 806 includes a third CNN (shown as CNN3 in FIG. 8) that includes 3 channels of 7×7 filters having a stride of 1 (without padding). The input to the convolutional filter 806 includes the 14×14×12 volume output from the convolutional filter 804. The 7×7 filter for each of the 3 channels is convolutionally applied to the 14×14×12 volume to generate the 8×8×3 patch of color values for an output image 808. For example, the 8×8×3 patch can include an 8×8 array of pixels for the red color, an 8×8 array of pixels for the green color, and an 8×8 array of pixels for the blue color. Applying the three 7×7 filters to the input volume results in 1764 parameters (7×7×12×3). The total parameters for such a network is 8304 parameters.

Returning to FIG. 6, the raw image patch 621 is at full resolution. The structure of the convolutional neural network 600 is such that the convolutional filters operate on different resolutions of the raw image patch 621. A staggered approach can be used to combine different resolutions of weighted data representing the raw data of the raw image patch 621. A hierarchical architecture can be helpful for spatial processing. Noise reduction can be used as an illustrative example, in which case there are low frequency noises and high frequency noises. To effectively remove low frequency noises (noise that covers a large area of the image), very large spatial kernels are needed. If a reduced resolution version of the image is present (e.g., ¹⁄₆₄ resolution, ¹⁄₁₆ resolution, ¼ resolution, or the like), then a smaller filter can be used on the reduced resolution to effectively apply a very large spatial kernel (e.g., a 3×3 filter at ¹⁄₆₄th resolution is approximately a (3*8)×(3*8) kernel). Having the network 600 operate at lower resolutions thus allows efficient processing of lower frequencies. This process can be repeated by combining the information from the lower frequency/lower resolution processing with the next higher resolution to work on data at the next frequency/resolution. For example, using the staggered approach with different resolutions, the resulting weighted values of the different resolutions can be combined, and, in some cases, the combined result can then be combined with another resolution of weighted data representing the raw image patch 621. This can be iterated until the full resolution (or other desired resolution) is formed.

Strided convolutional filters (e.g., strided CNNs) can be designed to generate the reduced resolution weighted outputs representing the data of the raw image patch 621.

Different sizes of filter arrays can be used for the strided convolutional filters, and each of the strided convolutional filters include a stride value larger than 1. Examples of resolutions on which the network 600 can operate include 1/64 resolution, 1/16 resolution, 1/4 resolution, full resolution, or any other suitable resolution.

Figures 9, 10:
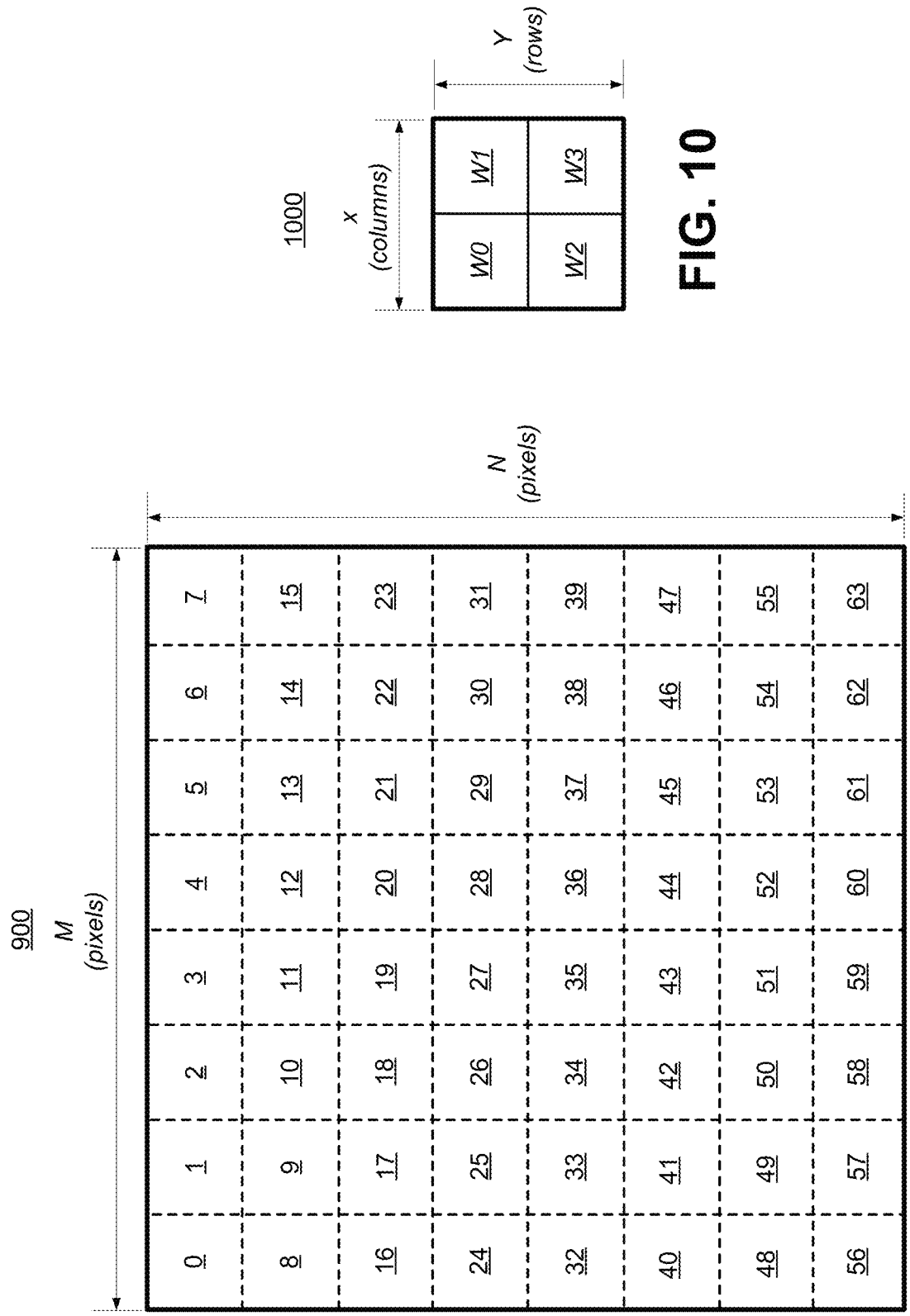
FIG. 9 is a diagram illustrating an example of a raw image patch, in accordance with some examples.
FIG. 10 is a diagram illustrating an example of a 2×2 filter of a strided convolutional neural network of a hidden layer in the neural network of the machine learning image signal processor, in accordance with some examples.

FIG. 9, FIG. 10, and FIG. 11A-FIG. 11E illustrate the application of a strided CNN. For example, FIG. 9 is a diagram illustrating an example of a raw image patch 900. The raw image patch 900 includes an M×N array of pixels, wherein M and N are integer values. The value of M and the value of N can be equal or can be different values. In the example shown in FIG. 9, the value of M is equal to 8, and the value of N is equal to 8, making the raw image patch 900 an 8×8 array of 64 raw image pixels. The pixels of the image patch 900 are sequentially numbered from 0 to 63. In some cases, the raw image pixels of the raw image patch 900 can be in a Bayer pattern (not shown) or other suitable pattern. FIG. 10 is a diagram illustrating an example of an x×y convolutional filter 1000 of a strided CNN in a neural network of a machine learning ISP. The filter 1000 illustrated in FIG. 10 has an x-value of 2 and a y-value of 2, making the filter 1000 a 2×2 filter with weights w0, w1, w2, and w3. The filter 1000 has a stride of 2, meaning that the filter 100 is applied in a convolutional manner to the raw image patch 900 shown in FIG. 9 with a step amount of 2.

Figures 11A, 11B:
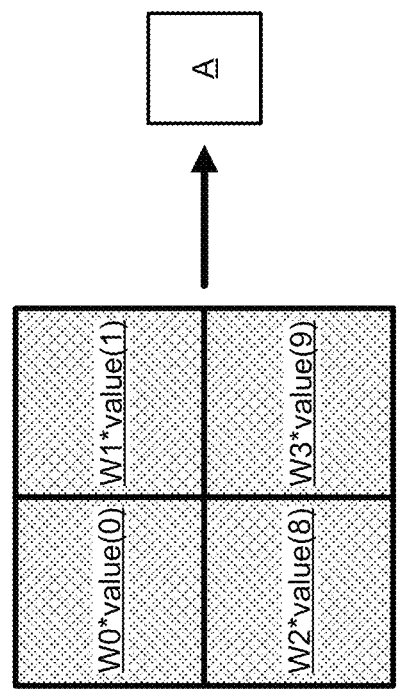

FIG. 11A-FIG. 11E are diagrams illustrating an example of application of the 2×2 filter 1000 to the raw image patch 900. As shown in FIG. 11A, the filter 1000 is first applied to the top-left most pixels of the raw image patch 900. For example, the weights w0, w1, w2, and w3 of the filter 1000 are applied to the pixels 0, 1, 8, and 9 of the raw image patch 900. As shown in FIG. 11B, the weight w0 is multiplied by the value of pixel 0, the weight w1 is multiplied by the value of pixel 1, weight w2 is multiplied by the value of pixel 8, and the weight w3 is multiplied by the value of pixel 9. The values (shown as W0*value(0), W1*value(1), W2*value(8), W3*value(9)) resulting from the multiplications can then be summed together (or otherwise combined) to generate an output A for that node or iteration of the filter 1000.

The filtering process for the strided CNN is continued at a next location in the raw image patch 900 by moving the filter 1000 by the stride amount of 2 to the next receptive field. Because the stride amount of the strided CNN is set to 2, the filter 1000 is moved to the right by two pixels, as shown in FIG. 11C. When moved to the right by two pixels, the weights w0, w1, w2, and w3 of the filter 1000 are applied to the pixels 2, 3, 10, and 11 of the raw image patch 900. For example, as shown in FIG. 11D, the weight w0 is multiplied by the value of pixel 2, the weight w1 is multiplied by the value of pixel 3, weight w2 is multiplied by the value of pixel 10, and the weight w3 is multiplied by the value of pixel 11. The values (shown as W0*value(2), W1*value(3), W2*value(10), W3*value(11)) resulting from the multiplications can then be summed together (or otherwise combined) to generate an output B for that node or iteration of the filter 1000.

Figure 11E:
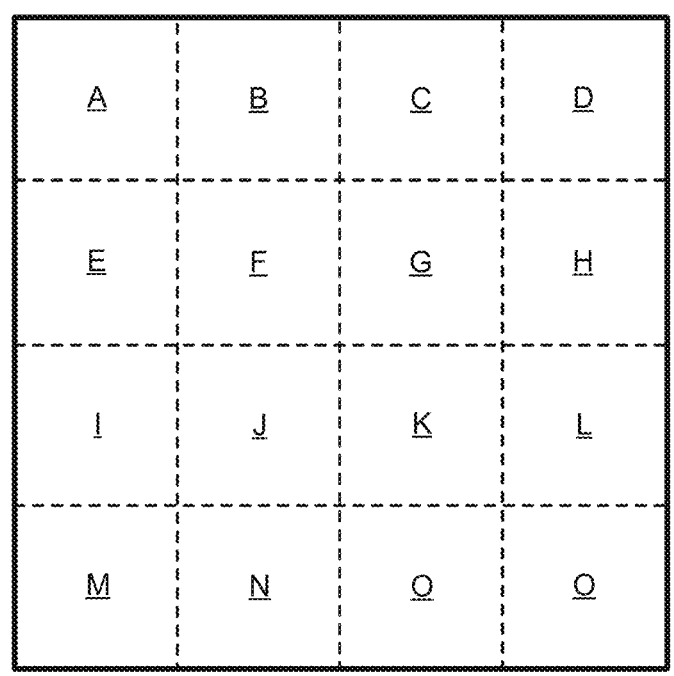

A similar process can be applied until the filter 1000 has been convolved around the entire raw image patch 900. FIG. 11E shows a feature map 1100 resulting from the filter 1000 being applied to the raw image patch 900. The feature map 1100 includes the total sum values A through O resulting from each iteration of the filter 1000 on the raw image patch. The feature map 1100 represents a reduced resolution set of weighted feature data values that provide a multi-dimensional representation (when multiple channels are used) of the data at each pixel of the raw image patch 900. Because the stride of the strided CNN is set to a value of 2, the feature map 1100 has a reduced resolution of 4×4, providing a ½ resolution weighted representation of the raw image patch 900.

Returning to FIG. 6, the strided convolutional filters of the convolutional neural network 600 include a strided CNN1 623, strided CNN2 624, and a strided CNN3 625. The strided CNN1 623 can include a number of channels of convolutional filters that operate to generate feature map arrays containing weighted data values (referred to as feature data) representing the raw image data of the raw image patch 621. The feature map arrays generated by the strided CNN1 623 are a 1/64 resolution weighted representation of the raw image patch 621. The representative weighted values of the feature data can be obtained by convolving the filter array of weights of the CNN1 623 across the 128×128×11 input volume in a way that reduces the dimensionality of the input by ⅛ in each of the vertical and horizontal directions (resulting in a total resolution reduction of 1/64). For example, the input array of 128×128 values (with a depth of 11) would be reduced to 16×16 feature map array of weighted feature data values. Different sizes of filter arrays and different stride amounts can be used for the strided CNN1 623 in order to reduce the resolution by the desired amount. In one illustrative example, the CNN1 623 can first apply a 2×2 filter array with a stride of 2 to the 128×128×11 volume of raw image data to generate 64×64 arrays of weighted values. Another 2×2 filter array can be applied to the 64×64 arrays of weighted values to generate 32×32 arrays, and then another 2×2 filter array can be applied to the 32×32 arrays to generate the 16×16 feature map arrays of weighted values. In another illustrative example, the CNN1 623 can apply 8×8 arrays with a stride of 8 to the 128×128 input raw image patch 621 in order to reduce the arrays from 128×128 to 16×16. Any other size filter array and stride amount can be used to generate arrays of weighted values that are 1/64 the size of the raw image patch 621. As noted previously, the strided CNN1 623 has a plurality of channels (e.g., 64 or other value), and thus will apply all 64 different filter arrays having different arrays of weights. In the example of 64 channels, the result will be 64 different 16×16 arrays of weighted values, each 16×16 array representing a different feature of the raw image patch 621. In some examples, the choice of the number of channels for each of the CNNs can be different. For example, each CNN could have a distinct number of channels. In some examples, all of the CNNs can have the same number of channels.

The result of the strided CNN1 623 is a reduced resolution set of weighted feature data values that provide a multi-dimensional representation of the features of the raw image patch 621. For example, the weighted feature data values provide multi-dimensional representations of the data at each pixel of the raw image patch 621. In cases when each convolutional filter has 64 channels, the strided CNN1 623 generates 64 16×16 feature map arrays of weighted values. After the strided CNN1 623, which performs strided convolutions as described above, a CNN8 631 is provided to process the output from the CNN1 623. The CNN8 631 can include a series of convolutions with a stride equal to 1. For example, the 64 16×16 arrays from CNN1 623 can be reduced to 64 8×8 arrays by the CNN8 631. The 8×8 arrays from the CNN8 631 can then be upsampled to a size of 16×16 before being combined with the arrays from the CNN9 632, as described below. A benefit of downsampling the data and then upsampling the data is to optimize the computation requirement. For example, the downsampled result is processed by CNN8 631 in order to gather information at the lower resolution. If the data was not first downsampled, the use of larger filters would be needed to achieve a similar result in the higher resolution.

In parallel with the strided CNN1 623, a ¹⁄₁₆ resolution strided CNN2 624 produces 64¹⁄₁₆ resolution feature map arrays of weighted values. In one illustrative example, the CNN 2 624 can first apply a 2×2 filter array with a stride of 2 to the 128×128×11 volume of raw image data (associated with the raw image patch 621) to generate 64×64 arrays of weighted feature data values. Another 2×2 filter array can be applied to the 64×64 array of weighted values to generate a 32×32 feature map array of feature data values. In another illustrative example, a 4×4 array can be applied with a stride of 4 to the 128×128 input raw image patch 621 to reduce the array from 128×128 to 32×32. Any other size filter array and stride amount can be used to generate a feature map array of weighted feature data values that is ¹⁄₁₆ the size of the raw image patch 621. The strided CNN2 624 has a plurality of channels (e.g., 64 or other suitable value), and will apply all 64 different filter arrays. When 64 channels are used, the result will be 64 different 32×32 arrays of weighted values, with each array representing a different representation of the data of the raw image patch 621 at the quarter resolution.

After the strided CNN2 624, a CNN9 632 is provided to process the output from the CNN2 624. The CNN9 632 is similar to the CNN8 631, and can include a series of convolutions with a stride equal to 1. For example, the 32×32 size arrays from CNN2 624 can be reduced to 16×16 arrays by the CNN9 632. As shown, the 64 feature map arrays of weighted feature data values from the CNN8 631 are combined with the 64 16×16 feature map arrays of weighted feature data values from the CNN9 632. As noted above, the 16×16 size arrays from CNN1 623 can be reduced to 8×8 arrays by the CNN8 631. To combine the lower resolution 8×8 arrays with the larger 16×16 arrays, the lower resolution data needs to be upsampled so that the values in the arrays from the from the CNN8 631 and the CNN9 632 can be combined. In some examples, the 8×8 arrays from the CNN8 631 can be upsampled by increasing the array to a 16×16 size, and then duplicating the values from the 8×8 arrays horizontally and vertically so that the upscaled 16×16 array has values at every node. The weighted values from the upscaled 16×16 arrays can then be added to the weighted values from the 16×16 arrays from the CNN9 632 to produce the combined 16×16 arrays of weighted values. Because the number of channels of each convolutional filter (e.g., CNN8 631 and CNN9 632) are the same, the number of dimensions (corresponding to the number of channels) align for being added together.

The combined 64 16×16 feature map arrays of weighted values (based on the combining of the arrays from the CNN8 631 and the CNN9 632) are then processed by the CNN4 626. The CNN4 626, the CNN5 627, the CNN6 628, and the CNN7 629 can include a same number of channels (with weights representing different dimensions of data), such as the 64 channels used in the examples above. The CNN4 626, the CNN5 627, the CNN6 628, and the CNN7 629 also have a stride equal to 1, and thus are not referred to as strided filters. For example, the CNN4 626, the CNN5 627, the CNN6 628, and the CNN7 629 can include 64 channels of 3×3 filters having a stride of 1.

As noted above, the combined 64 16×16 feature map arrays of weighted values are processed by the CNN4 626. The CNN4 626 processes these 16×16 arrays with a series of convolutional layers (with stride equal to 1) until the arrays are reduced to 8×8. The output from the CNN4 626 are then upsampled from 8×8 to 16×16 dimensional arrays before being combined with the arrays from the CNN10 633.

The strided CNN3 625 processes the raw image patch 621 in a way that reduces the resolution from 128×128 to 64×64. In one illustrative example, the CNN3 625 can apply a 2×2 filter array with a stride of 2 to the 128×128×11 volume of raw image data to generate 64×64 feature map arrays of weighted feature data values. After the strided CNN3 625, a CNN10 633 is provided to process the output from the CNN3 625. The CNN10 633 can include a series of convolutions with a stride equal to 1, similar to the CNN8 631 and the CNN9 632. For example, the 64×64 size arrays from CNN3 625 can be reduced to 16×16 arrays by the CNN10 633. As shown, the 64 16×16 feature map arrays of weighted feature data values from the CNN10 633 are then combined with the 64 upscaled 16×16 feature map arrays from the CNN4 626.

The combined 16×16 feature map arrays are then processed by the CNN5 627 to produce further weighted sets of arrays. The output from the CNN5 627 is upsampled to full resolution and the full resolution feature map arrays with weighted full resolution feature data values are combined with a full resolution set of feature map arrays output from the CNN6 628. The CNN6 628 operates on the full resolution version of the raw image patch 621. The full resolution CNN6 628 can be used so that the network 600 can generate a full resolution pixel RGB output. The full resolution can be used in cases in which it is desired or important for the application to provide an image at full resolution. The full resolution CNN6 628 is needed to produce the full image resolution in the output. For applications that only need a partial resolution image, the full resolution layer (CNN6 628) can be removed or omitted from the network 600.

The combined full resolution feature map arrays are then processed by the CNN7 629 to produce the final output RGB patch 630 that is based on the raw image patch 621. The output RGB patch 630 can be determined based on the multi-dimensional data or features determined by the different convolutional filters of the convolutional neural network 600. Using the example from above, the convolutional filters of the network 600 provide a functional mapping (based on the various weights of the convolutional filters) of the input volume of the 128×128 raw image patch 621 to the 8×8 output RGB patch 630. In some examples, the output RGB patch 630 includes a red color component, a green color component, and a blue color component per pixel. One of ordinary skill will appreciate that color spaces other than RGB can also be used, such as luma and chroma (YCbCr or YUV) color components (e.g., in which case the plurality of color components per pixel include a luma color component per pixel, a first chroma color component per pixel, and a second chroma color component per pixel), or other suitable color components. In some examples (not shown in FIG. 6), the output can be a monochrome image patch, where the network 600 performs noise reduction, tone mapping, or other ISP-based function.

As described above, the array of pixels in the output RGB patch 630 can include a smaller dimension than the dimension of the input raw image patch 621. Using the example from above, the raw image patch 206 can include a 128×128 array of raw image pixels (e.g., in a Bayer pattern), and application of the repetitive convolutional filters of the network 600 causes the output RGB patch 630 to include 3 dimensions of 8×8 arrays of pixels. One dimension is for the red colors of each pixel, one dimension is for the green colors of each pixel, and one dimension is for the blue colors of each pixel. FIG. 12A is a diagram illustrating an example of an output image patch 1200A including an 8×8 array of the red color components R0 through R63 of the output RGB patch 630. FIG. 12B is a diagram illustrating an example of an output image patch 1200B including an 8×8 array of the green color components G0 through G63 of the output RGB patch 630. FIG. 12C is a diagram illustrating an example of an output image patch 1200C including an 8×8 array of the blue color components B0 through B63 of the output RGB patch 630.

As noted above, the patches from an input frame of raw image data can be defined so that they are overlapping with one another, which allows the complete output image to contain a complete picture even in view of the reduction in dimensionality from the input to the output. The resulting final output image contains processed output image patches derived from the raw input data by the convolutional neural network 600. The output image patches are arranged next to one another in a non-overlapping manner to produce the final output image (e.g., the first output image patch, followed by the second output image patch, and so on). The final output image can be rendered for display, used for compression (or coding), stored, or used for any other image-based purposes.

In some cases, the full resolution raw image patch 621 can be cropped before being processed by one or more of the convolutional filters of the convolutional neural network 600. For example, to get the reduced dimension output (e.g., to go from a 128×128 input to an 8×8 output), more convolutional layers are needed to process the larger inputs of the full resolution. The raw image patch 621 can be cropped by removing some of the pixels on the edges of the raw image patch 621 before applying the convolutional filters on the patch 621. The cropping is optional at each convolutional filter based on the needs of the network 600. In one illustrative example, the raw image patch 621 can be cropped for the full resolution CNN6 628 described above that produces a full resolution feature map array. For instance, because the final output RGB patch 630 is at a reduced dimension (e.g., an 8×8 array), all pixel location inputs for the full resolution 128×128 input may not be needed to provide the pixel-level context for the 8×8 center of the raw image patch 621. The neighborhood of pixels in the full resolution raw image patch 621 that likely impacts the details of the final 8×8 output are closer to the 8×8 set of pixels around the center of the raw image patch 621. In such cases, the raw image patch 621 can be cropped so that a smaller neighborhood of pixels surround the center 8×8 portion of the raw image patch 621. In one illustrative example, a 32×32 array of pixels around the center can be cropped from the full resolution raw image patch 621.

In some cases, the network 600 can be designed to avoid batch normalizing and pooling, and is designed to have no padding. For example, the network 600 intentionally does not have a batch normalization layers and pooling layers, and has no padding in some cases. The pooling can be excluded from the network 600 because pooling layers can be disruptive on the resolution of an image. For image signal processing functions, a highly detailed result is desired at a particular resolution, in which case pooling is not useful. Normalization layers can also be removed. At the different layers, the batch norm that is typically performed in some networks scales and shifts the data at the particular layer to provide a better data range for next layers to process. Such normalization layers can be useful for classification problems, because classification systems attempt to find whether a particular feature or class is present, so if the data output from a layer is scaled and shifted, the result is still preserved because the data is scaled and shifted by the same amount. However, for the regression problem that the machine-learning ISP neural network performs to go from a continuous value input to a continuous value output, how different pixels are shifted and scaled relative to each other cannot be arbitrary. For example, the colors of the image need to be well preserved, the different details in an image patch need to be preserved to make sense on the larger scheme of the entire image, among others. For these reasons and others, the normalization layers can be omitted from the network 600.

The network 600 also does not include a fully connected layer, and instead uses a CNN (CNN7 629) as the last layer in the network 600. An advantage of the fully convolutional network (without any fully connected layer) is that the network is not size constrained. For example, CNNs are translationally invariant. Because the processing in the network 600 is translationally invariant, the same learned filters can be applied on larger or smaller input sizes. For instance, if an input size needed to be 256×256, the same parameters from the 128×128 network of FIG. 6 can be used. Another advantage of the fully convolutional network is that fully connected layers have many more parameters and computation as compared to using just convolutional layers, as shown in FIG. 6. For instance, if a fully connected layer was to generate the output RGB patch 630, the number of parameters would be much larger than if only CNNs are used, as shown in FIG. 6.

As noted above, the output RGB patches are tiled together to produce the final output image. Since no padding is performed on the data, seams in the final output image can be avoided. For example, padding the data can create artificial information at the edges, which in turn can cause seams. The network uses the filtering operations to make the width and/or height smaller, which allows the network to work on the actual data from the image, rather than padding the data.

By using machine-learning to perform the ISP functions, the ISP becomes customizable. For example, different functionalities can be developed and applied by presenting targeted data examples and changing the network weights through training. The machine learning based ISP can also achieve fast turn-around for updates as compared to hard-wired or heuristic-based ISPs. Further, a machine learning based ISP removes the time consuming task of tuning the tuning parameters that are required for standard ISPs. For example, there is a significant amount of effort and staffing used to manage ISP infrastructures. A holistic development can be used for the machine learning ISP, during which the end-to-end system is directly optimized and created. This holistic development is in contrast to the piece-by-piece development of the functional blocks of standard ISPs. Imaging innovation can also be accelerated based on the machine learning ISP. For example, a customizable machine learning ISP unlocks many innovation possibilities, allowing developers and engineers to more quickly drive, develop, and adapt solutions to work with novel sensors, lenses, camera arrays, among other advancements.

FIG. 13 is a flowchart illustrating an example of a process 1300 for processing image data using one or more neural networks using the techniques described herein. At block 1302, the process 1300 includes obtaining raw image data captured using one or more image sensors. The raw image data includes a plurality of pixels. The raw image data includes a single color component per pixel. In some examples, the obtained raw image data includes image data from the one or more image sensors filtered by a color filter array. The color filter array can include any suitable color filter, such as a Bayer color filter array. For example, an image sensor with a Bayer pattern color filter array (or other suitable color filter array) with one of either red, green, or blue filters at each pixel location can be used to capture raw image data with a single color per pixel location. In some examples, the obtained raw image data includes a patch of raw image data. The patch of raw image data includes a subset of a frame of raw image data captured by the one or more image sensors. For instance, using the examples from above, a raw image patch can include an 128×128 patch of pixels from a raw data input frame or image. In some cases, the raw image patches can be overlapping in the raw data input frame. In some examples, the process 1300 includes obtaining additional data for augmenting the obtained raw image data, the additional data including at least one or more of tone data, radial distance data, or auto white balance (AWB) gain data.

At block 1304, the process 1300 includes applying at least one neural network to the raw image data to determine a plurality of color component values for one or more pixels of the plurality of pixels. At block 1306, the process 1300 includes generating output image data based on application of the at least one neural network to the raw image data. The output image data has the plurality of color components for the one or more pixels. In some examples, generating the output image data includes generating a patch of output image data. The patch of output image data includes a subset of a frame of output image data. Application of the at least one neural network causes the patch of output image data to include fewer pixel locations than the patch of raw image data. For instance, using the examples from above, an output image patch can include an 8×8 patch of pixels that will be part of an output image.

In some implementations, applying the at least one neural network to the raw image data includes applying one or more strided convolutional filters to the raw image data to generate reduced resolution data representative of the raw image data. For example, a strided convolutional filter can include a convolutional filter with a stride greater than one. Each strided convolutional filter of the one or more strided convolutional filters includes an array of weights. Examples of strided convolutional filters include the strided CNN1 623, the strided CNN2 624, and the strided CNN3 625 described above with respect to FIG. 6. In some examples, each strided convolutional filter of the one or more strided convolutional filters can include a plurality of channels. Each channel of the plurality of channels includes a different array of weights. The channels are high dimensional representations of the data at each pixel. For example, using the plurality of channels, the neural network can transform these high dimensional representations as the data moves through the neural network.

As noted above, the one or more strided convolutional filters can include a plurality of strided convolutional filters. For example, the plurality of strided convolutional filters include a first strided convolutional filter having a first array of weights and a second strided convolutional filter having a second array of weights. Application of the first strided convolutional filter to the raw image data generates a first set of weighted data representative of the raw image data. The first set of weighted data having a first resolution. Application of the second strided convolutional filter generates a second set of weighted data representative of the raw image data. The second set of weighted data has a second resolution that is of a lower resolution than the first resolution. In some cases, the second strided convolutional filter can be applied to the raw image data to generate the second set of weighted data. Such an example is shown in FIG. 6, wherein the strided CNN2 624 is an example of the first strided convolutional filter and the strided CNN1 623 is an example of the second strided convolutional filter. In other cases, the second strided convolutional filter can generate the second set of weighted data from an output from another convolutional filter. In one illustrative example, the first set of weighted data having the resolution can be formed by the first strided convolutional filter, and the second strided convolutional filter can be concatenated after the first strided convolutional filter to form the second set of weighted data having the second resolution.

In some cases, the process 1300 includes upscaling the second set of weighted data having the second resolution to the first resolution, and generating combined weighted data representative of the raw image data by combining the upscaled second set of weighted data with the first set of weighted data having the first resolution. Using the example from above, the data output from the strided CNN1 623 (as the second strided convolutional filter) can be upsampled so that the values from the strided CNN1 623 can be combined with the data output from the strided CNN2 624 (as the first strided convolutional filter). In some cases, a first convolutional filter with a stride equal to 1 can be placed in the network after the first strided convolutional filter and a second convolutional filter with a stride equal to 1 can be placed in the network after the second strided convolutional filter. In such cases, the output array of data from the second convolutional filter with a stride equal to 1 can be upscaled, and the upscaled output array can be combined with the output array from the first convolutional filter with a stride equal to 1. An example of the first convolutional filter with a stride equal to 1 is the CNN9 632 shown in FIG. 6, and an example of the second convolutional filter with a stride equal to 1 is the CNN8 631.

In some examples, the process 1300 can include applying one or more convolutional filters to the combined weighted data to generate feature data representative of the raw image data. Each convolutional filter of the one or more convolutional filters include an array of weights. Each of the convolutional filters can also include a stride of 1, in which case the convolutional filters are not strided filters (do not have a stride greater than 1).

In some cases, the process 1300 can include upscaling the feature data to a full resolution; and generating combined feature data representative of the raw image data by combining the upscaled feature data with full resolution feature data. The full resolution feature data is generated by applying a convolutional filter to a full resolution version of the raw image data.

In some examples, generating the output image data includes applying a final convolutional filter to the feature data or the combined feature data to generate the output image data. In some cases, the at least one neural network does not include a fully connected layer. For instance, a fully connected layer is not used before or after the final convolutional filter. In some cases, the at least one neural network does not include any pooling layers. For example, a pooling layer is not used before or after the final convolutional filter.

In some cases, the plurality of color components per pixel include a red color component per pixel, a green color component per pixel, and a blue color component per pixel. In some cases, the plurality of color components per pixel include a luma color component per pixel, a first chroma color component per pixel, and a second chroma color component per pixel.

In some cases, the at least one neural network jointly performs multiple image signal processor (ISP) functions. In some examples, the at least one neural network includes at least one convolutional neural network (CNN). In some cases, the at least one neural network includes a plurality of layers. In some aspects, the plurality of layers are connected with a high-dimensional representation of the raw image data.

In some examples, the process 1300 may be performed by a computing device or an apparatus, such as the machine learning ISP 200 shown in FIG. 2. In some cases, the computing device or apparatus may include a processor, microprocessor, microcomputer, or other component of a device that is configured to carry out the steps of process 1300. In some examples, the computing device or apparatus may include a camera configured to capture video data (e.g., a video sequence) including video frames. In some cases, the computing device may include a camera device that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data, or any other suitable type of data.

Process 1300 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof. One of ordinary skill will appreciate that the less than ("<") and greater than (">") symbols or terminology used herein can be replaced with less than or equal to ("≤") and greater than or equal to ("≥") symbols, respectively, without departing from the scope of this description.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing image data using one or more machine learning systems, the method comprising:
obtaining input data including image data and additional data for augmenting the image data;
applying at least one machine learning system to at least a portion of the image data and the additional data to determine at least one color component value for one or more pixels of at least the portion of the image data, wherein applying the at least one machine learning system to at least the portion of the image data includes applying one or more convolutional filters to at least the portion of the image data to generate reduced resolution data representative of at least the portion of the image data, each convolutional filter of the one or more convolutional filters including an array of weights; and
generating, based on application of the at least one machine learning system to at least the portion of the image data, output image data for a frame of output image data, the output image data including the at least one color component value.

2. The method of claim 1, wherein the image data includes raw image data.

3. The method of claim 1, wherein the image data includes a patch of pixels from a frame of image data, and wherein the at least one machine learning system is applied to the patch of pixels.

4. The method of claim 1, wherein the image data includes a patch of raw image data, the patch of raw image data including a subset of pixels of a frame of raw image data.

5. The method of claim 4, wherein the frame of raw image data includes raw image data from one or more image sensors filtered by a color filter array.

6. The method of claim 1, wherein the output image data includes the at least one color component value for one or more pixels of the frame of output image data.

7. The method of claim 1, wherein output image data includes a patch of output image data, the patch of output image data including a subset of pixels of the frame of output image data.

8. The method of claim 1, wherein the additional data includes at least one or more of tone data, radial distance data, or auto white balance (AWB) gain data.

9. The method of claim 1, wherein the at least one machine learning system includes at least one neural network.

10. The method of claim 1, wherein applying the at least one machine learning system to the image data results in a plurality of color component values being determined for each pixel of the one or more pixels of the frame of output image data.

11. The method of claim 1, wherein the image data is captured by an image sensor.

12. The method of claim 1, wherein the image data is captured by a plurality of image sensors.

13. An apparatus for processing image data using one or more machine learning systems, comprising:
at least one memory; and
at least one processor coupled to the at least one memory and configured to:
obtain input data including image data and additional data for augmenting the image data;
apply one or more convolutional filters of at least one machine learning system to at least a portion of the image data to generate reduced resolution data representative of the image data, each convolutional filter of the one or more convolutional filters including an array of weights;
determine, based on application of the one or more convolutional filters to at least the portion of the image data and based on the additional data, at least one color component value for one or more pixels of at least the portion of the image data; and
generate output image data for a frame of output image data, the output image data including the at least one color component value.

14. The apparatus of claim 13, wherein the image data includes raw image data.

15. The apparatus of claim 13, wherein the image data includes a patch of pixels from a frame of image data, and wherein the one or more convolutional filters of the at least one machine learning system is applied to the patch of pixels.

16. The apparatus of claim 13, wherein the image data includes a patch of raw image data, the patch of raw image data including a subset of pixels of a frame of raw image data.

17. The apparatus of claim 16, wherein the frame of raw image data includes raw image data from one or more image sensors filtered by a color filter array.

18. The apparatus of claim 13, wherein the output image data includes the at least one color component value for one or more pixels of the frame of output image data.

19. The apparatus of claim 13, wherein output image data includes a patch of output image data, the patch of output image data including a subset of pixels of the frame of output image data.

20. The apparatus of claim 13, wherein the additional data includes at least one or more of tone data, radial distance data, or auto white balance (AWB) gain data.

21. The apparatus of claim 13, wherein the at least one machine learning system includes at least one neural network.

22. The apparatus of claim 13, wherein applying the at least one machine learning system to the image data results in a plurality of color component values being determined for each pixel of the frame of output image data.

23. The apparatus of claim 13, wherein the image data is captured by at least one image sensor.

24. The apparatus of claim 23, further comprising the at least one image sensor.

25. A non-transitory computer-readable medium having stored thereon instructions that, when executed by one or more processors, cause the one or more processors to:

obtain input data including image data and additional data for augmenting the image data;

apply at least one machine learning system to at least a portion of the image data and the additional data to determine at least one color component value for one or more pixels of at least the portion of the image data, wherein applying the at least one machine learning system to at least the portion of the image data includes applying one or more convolutional filters to at least the portion of the image data to generate reduced resolution data representative of at least the portion of the image data, each convolutional filter of the one or more convolutional filters including an array of weights; and generate, based on application of the at least one machine learning system to at least the portion of the image data, output image data for a frame of output image data, the output image data including the at least one color component value.

26. The non-transitory computer-readable medium of claim 25, wherein the output image data includes the at least one color component value for one or more pixels of the frame of output image data.

27. The non-transitory computer-readable medium of claim 25, wherein the additional data includes at least one or more of tone data, radial distance data, or auto white balance (AWB) gain data.

28. The non-transitory computer-readable medium of claim 25, wherein the image data includes raw image data.

29. The non-transitory computer-readable medium of claim 25, wherein the image data includes a patch of pixels from a frame of image data, and wherein the at least one machine learning system is applied to the patch of pixels.

\* \* \* \* \*